(12) United States Patent
Boardman et al.

(10) Patent No.: US 9,187,678 B2
(45) Date of Patent: Nov. 17, 2015

(54) RELEASE FILMS VIA SOLVENTLESS EXTRUSION PROCESSES

(71) Applicant: 3M INNOVATIVE PROPERTIES COMPANY, St. Paul, MN (US)

(72) Inventors: Larry D. Boardman, Woodbury, MN (US); Jeffrey O. Emslander, Stillwater, MN (US); Bryan C. Feisel, Hudson, WI (US); David S. Hays, Woodbury, MN (US); David J. Kinning, Woodbury, MN (US); Richard L. Peloquin, Maplewood, MN (US); David J. Yarusso, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 148 days.

(21) Appl. No.: 13/953,474

(22) Filed: Jul. 29, 2013

(65) Prior Publication Data

US 2015/0030796 A1 Jan. 29, 2015

(51) Int. Cl.
C09J 7/02 (2006.01)
C09D 123/04 (2006.01)
C08G 77/38 (2006.01)

(52) U.S. Cl.
CPC .............. *C09J 7/0228* (2013.01); *C08G 77/38* (2013.01); *C09D 123/04* (2013.01); *Y10T 428/31663* (2015.04)

(58) Field of Classification Search
None
See application file for complete search history.

(56) References Cited

U.S. PATENT DOCUMENTS

| | | | | |
|---|---|---|---|---|
| 2,532,011 | A | | 11/1950 | Dahlquist |
| 4,289,859 | A | * | 9/1981 | Kalinowski et al. ........... 525/104 |
| 4,656,212 | A | * | 4/1987 | Hosoda et al. ................. 524/269 |
| 5,139,835 | A | * | 8/1992 | Kitamura et al. ............. 428/41.4 |
| 5,213,743 | A | | 5/1993 | Ohara |
| 5,362,516 | A | * | 11/1994 | Wilson et al. ............... 427/207.1 |
| 5,403,891 | A | * | 4/1995 | Romenesko ................... 525/106 |
| 5,473,002 | A | | 12/1995 | Gardiner |
| 5,708,084 | A | * | 1/1998 | Hauenstein et al. .......... 525/102 |
| 5,708,085 | A | * | 1/1998 | Hauenstein et al. .......... 525/106 |
| 5,827,540 | A | * | 10/1998 | Motojima et al. ............. 424/489 |
| 6,921,729 | B2 | | 7/2005 | Schwab |
| 7,105,233 | B2 | | 9/2006 | Bechthold |
| 7,229,687 | B2 | | 6/2007 | Kinning |
| 7,897,666 | B1 | | 3/2011 | Berg |
| 2004/0052982 | A1 | | 3/2004 | Kobayashi et al. |
| 2004/0116018 | A1 | * | 6/2004 | Fenwick et al. ............... 442/164 |
| 2007/0166264 | A1 | | 7/2007 | Tamura et al. |
| 2007/0289495 | A1 | | 12/2007 | Cray et al. |
| 2010/0255205 | A1 | | 10/2010 | Cray et al. |
| 2012/0213959 | A1 | | 8/2012 | Schuhmann et al. |

FOREIGN PATENT DOCUMENTS

| | | | | |
|---|---|---|---|---|
| EP | 0527286 | * | 10/1992 | ........... C10M 107/50 |
| EP | 1710287 | | 10/2006 | |
| WO | 9115538 | | 10/1991 | |
| WO | WO 2009/051343 | | 4/2009 | |

OTHER PUBLICATIONS

PCT International Search Report for PCT/US2014/048366 mailed on Nov. 7, 2014, 4 pages.
"Alkyl Silicones," Siltech LLC, 2008 (8 pages).
"AlphaPlus C30+HA Technial Data", Chevron Phillips Chemical Company LP, Revised Jul. 2010 (1 page).
Kinning, David J., et al., "Release coatings for pressure sensitive adhesives", Adhesion Science and Engineering—2, Surfaces, Chemistry and Applications, p. 535, 2002 (3 pages).
Lewis, Larry N., et al., "Platinum Catalysts Used in the Silicones Industry: Their Synthesis and Activity in Hydrosilylation", Platinum Metals Rev., 1997, 41, (2) pp. 66-75 (10 pages).

* cited by examiner

*Primary Examiner* — Robert S Loewe
(74) *Attorney, Agent, or Firm* — Sandra K. Nowak

(57) ABSTRACT

Described herein are release layers formed via solventless extrusion. The release layers include a polyolefin and an alkyl dimethicone. The release layers exhibit tailorable release properties from pressure-sensitive adhesives. The release layers are simple to make and require no post-treatment in order to impart the observed release properties. The release layers are adaptable to multilayer extrusion, blown film formation, and cast film formation techniques.

25 Claims, No Drawings

RELEASE FILMS VIA SOLVENTLESS EXTRUSION PROCESSES

BACKGROUND

Pressure sensitive adhesive tapes, or adhesive tapes, are often provided in roll form, wherein the tape construction includes a backing, an adhesive layer on one major side of the backing, and a release layer on the other major side of the backing. The release layer allows the tape to be unwound from the roll at a controlled level.

Other articles having release characteristics are employed in a variety of applications. Any adhesive coated article, including tapes, die-cut adhesive articles, labels, and the like, require, as a matter of practicality, a release coating or a separate release liner. The release coating or liner provides a surface to which the article does not permanently adhere.

Duct tapes are a common and widely used type of adhesive tape. Duct tapes typically include a scrim, a polymer film backing, and an aggressive, rubber resin-based pressure sensitive adhesive that is coated over the scrim and the backing. The scrim provides strength to the tape and additionally allows the tape to be hand torn. Conventional melt blown polyethylene films used to make duct tape backings either do not contain a release material or employ low molecular weight release materials (e.g., waxes) that can bloom to the free surface of the backing and provide a release function. Without the use of release material, the unwind forces of duct tapes made with such films are extremely high due to the aggressive nature of the pressure sensitive adhesive employed. However, the low molecular weight release materials are cohesively weak and are not strongly bound to the film surface; therefore, the release material can transfer to the adhesive surface when the tape roll is unwound, resulting in reduced adhesion levels of the adhesive when applied to the target surface.

Conventional means to apply release layers on various articles, including but not limited to duct tape constructions, include solvent coating. Solvent coated release layers have been applied by dissolving the components in a solvent, coating the solution onto the targeted release surface, and drying to evaporate the solvent. One example of this approach is described by Dahlquist et al., U.S. Pat. No. 2,532,011. However, solvent based processes require a separate step to apply the release material, and further are of concern as a process typically requiring the use of volatile organic compounds (VOCs).

One non-solvent based approach to forming a release layer is extrusion or coextrusion of the release layer. That is, the release material is mixed with an extrudable polymer to form a release layer.

Berg, U.S. Pat. No. 7,897,666 discloses a silicone release material that can be added to an extrudable thermoplastic polymer. However, the additive requires the use of polyphosphoric acid as a binding agent, in order to impart non-migratory properties and prevent poor readhesion of the adhesive article.

Mohajer et al., WO 91/15538 discloses a release film including a base polymer and a silicone copolymeric additive such as a silicone polyamide or silicone polyurea.

Gardiner et al., U.S. Pat. No. 5,473,002 discloses a silicone additive that can be added to an extrudable thermoplastic polymer, the additive derived from silicone diamines and rosin isocyanates.

Bechtold et al., U.S. Pat. No. 7,105,233 discloses organosiloxane additives, wherein the additives are prepared by dehydrogenative coupling. The reaction results in the formation of Si—O—C linkages, which are known to be thermally and/or hydrolytically unstable and therefore unsuitable for extrusion processes.

Ohara et al., U.S. Pat. No. 5,213,743 discloses a method of making a release paper, wherein an alkyl modified silicone, or alkyl dimethicone, is melt blended with a polyolefin and extrusion coated onto a substrate. However, the blend must be post-treated, for example by heating the coated substrate for a period of 20 minutes, to cause the silicone to "bleed" to the surface in order to impart release properties.

There is a need in the industry to provide an extruded release layer, wherein release properties are provided without additional solvent coating, without provision of other additives, and without additional steps such as post-treatments. There is a need to provide release materials that concentrate sufficiently at the surface of the extrudate prior to solidification of an extruded layer in order to impart release properties thereto. There is a need to provide such release layers that do not transfer materials to the adhesive when it is contacted with the release layer.

SUMMARY

We report herein alkyl dimethicone compositions and methods of making alkyl dimethicone compositions, as well as methods of making release layers by combining polyolefins with alkyl dimethicones. The release layers of the invention are formed in a single step extrusion process using conventional equipment, wherein the release layer is extruded as a single layer or coextruded along with one or more additional layers, optionally by extrusion coating onto a selected substrate. Extrusion processing of the release layers is characterized in that no post-treatment steps are required to impart release properties thereto. The surface of the release layers formed using the methods of the invention have tailorable release properties, wherein the release force required to separate the release layer from a pressure sensitive adhesive is selected based on the intended application and is, in various embodiments, characterized as "premium", that is, having a release force of between about 0 g/cm and 10 g/cm; "modified", that is, having a release force of between about 10 g/cm and 50 g/cm, or "tight", that is, having a release force of greater than 50 g/cm and up to about 1400 g/cm, for example in some embodiments, between about 500 g/cm and 1200 g/cm; or in any intermediate range between these ranges; or in ranges above 1400 g/cm. Pressure sensitive adhesive articles contacted with the surface of the release layers retain adhesive properties upon release. The methods of the invention are easily adapted to processes such as blown and cast film formation.

In some embodiments, the invention is a method of making an alkyl dimethicone composition, wherein the alkyl dimethicone composition includes a fully alkylated dimethicone, the method including contacting a methylhydrosilyl functional compound with a first α-olefin in an amount corresponding to about 0.7 to 1.3 molar equivalents of the first α-olefin per mole of hydrosilyl functionality present in the methylhydrosilyl functional compound, the first α-olefin having between 20 and 50 carbons, the contacting comprising conditions suitable for hydrosilylation, wherein the contacting causes formation of a partially alkylated dimethicone;

contacting the partially hydrosilylated compound with a second α-olefin in an amount corresponding to about 0.1 to 1.0 molar equivalents of the second α-olefin per mole of hydrosilyl functionality present in the methylhydrosilyl functional compound, the second α-olefin having between 2 and 16 carbons, the contacting comprising conditions suitable for hydrosilylation, wherein the contacting causes formation of a fully alkylated dimethicone; and evaporating any unreacted amount of the second α-olefin from the fully alkylated dimethicone.

In some embodiments, the invention is a release layer including a thermoplastic and about 0.5 wt % to 10 wt % of an alkyl dimethicone, the alkyl dimethicone having the structure

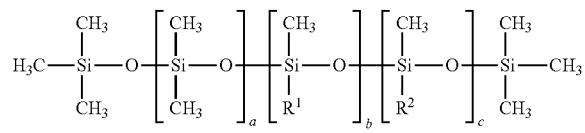

wherein the sum of (a+b+c) is between about 100 and 1000; the ratio of a to the sum of (b+c) is about 99:1 to 90:10; $R^1$ is a linear, branched, or cyclic alkyl group having between 20 and 50 carbon atoms; and $R^2$ is a linear, branched, or cyclic alkyl or alkaryl group having between 2 and 16 carbons. In some such embodiments, the repeat units designated a, b, and c are randomly dispersed throughout the structure and the structure is a random structure; in other such embodiments, the repeat units are disposed in discrete blocks within the structure, wherein one or more blocks of each repeat unit a, b, and c are present, and the structure is a block structure; and in still other such embodiments, the repeat units are disposed in a manner that is intermediate between a block structure and a random structure, and the structure is referred to as a "blocky" structure. In some embodiments, the thermoplastic is a polyolefin. In some embodiments, the release layer is disposed on a substrate. In some embodiments, the release layer is one layer in a multilayer construction.

In some embodiments, the invention is a release layer made by the method including combining a polyolefin with about 0.5 wt % to 10 wt % of an alkyl dimethicone, the alkyl dimethicone having the structure

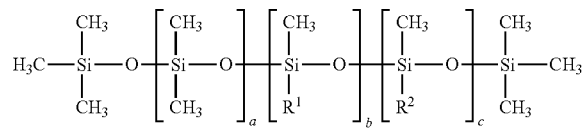

wherein the sum of (a+b+c) is between about 100 and 1000, the ratio of a to the sum of (b+c) is about 99:1 to 90:10, $R^1$ is a linear, branched, or cyclic alkyl group having between 20 and 50 carbon atoms; $R^2$ is a linear, branched, or cyclic alkyl or alkaryl group having between 2 and 16 carbons; and the structure is a random, block, or blocky structure, to form a blend; and melt processing the blend to form a release layer, wherein the method is characterized by the absence of a post-treatment.

In some embodiments, the invention is a method of making a release layer, the method including combining a polyolefin with about 0.5 wt % to 10 wt % of an alkyl dimethicone, the alkyl dimethicone having the structure

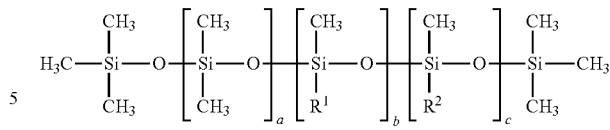

wherein the sum of (a+b+c) is between about 100 and 1000, the ratio of a to the sum of (b+c) is about 99:1 to 90:10, $R^1$ is a linear, branched, or cyclic alkyl group having between 20 and 50 carbon atoms; $R^2$ is a linear, branched, or cyclic alkyl or alkaryl group having between 2 and 16 carbons; and the structure is a random, block, or blocky structure, to form a blend; and melt processing the blend to form a release layer, wherein the method is characterized by the absence of a post-treatment. In some embodiments, the alkyl chain of repeat unit b, repeat unit c, or both are branched or cyclic alkyl groups instead of the linear alkyl groups represented in the structure shown.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Various embodiments will be described in detail, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

1. Definitions

As used herein, the term "alkyl dimethicone composition" means an alkyl dimethicone compound synthesized using the methods disclosed herein, together with any residual compounds or side products arising from the synthetic methodology described and not further purified, unless otherwise noted. "Alkyl dimethicone" means a genus that includes the alkyl dimethicone compositions as well as alkyl dimethicone compounds obtained via a different synthetic pathway and/or commercially obtained alkyl dimethicone compounds, used as obtained or with additional purification as dictated by context. While the structure of alkyl dimethicones herein are generally represented as linear structures, it will be understood by those of skill that such structures as synthesized or purchased contain, in some embodiments, an amount of branched structures. Such branching, using terminology understood by those of skill, is referred to as "T" and "Q" functionality. In any of the embodiments herein, a substantially linear alkyl dimethicone structure can contain an amount of T branching, Q branching, or both.

As used herein, the term "layer" means a portion of a film or sheet construction, the construction extruded through an extrusion film die, the layer being substantially planar and having two major sides.

As used herein, the term "release blend" means a mixture, whether blended, e.g., in a melt blending operation, or an admixture, as determined by context, that includes at least an alkyl dimethicone and a thermoplastic polymer.

As used herein, the term "release layer" means a release blend that has been melt blended and formed into a film layer, further wherein at least one major side thereof does not contact another layer of the film or sheet construction during layer formation.

As used herein, the term "multilayer construction" means a film or sheet construction, the construction extruded through an extrusion film die and including at least two contiguous layers wherein at least one layer thereof is a release layer. The first major side of the release layer contacts a major side of the contiguous layer, and the second major side of the release layer does not contact any other layer. In embodiments the contacting between the two or more contiguous layers is accomplished prior to the construction exiting the extrusion die.

As used herein, the term "post-treatment" means a treatment of a formed release layer that is carried out in order to improve the release properties of the release layer by causing migration (also known as blooming or bleeding) of an alkyl dimethicone to the release layer surface. Such treatments include, but are not limited to, holding the release layer at a temperature of 100° C. or greater for 10 minutes or more after melt processing is completed and while the release layer is exposed to air.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

As used herein, the term "optional" or "optionally" means that the subsequently described event or circumstance may but need not occur, and that the description includes instances where the event or circumstance occurs and instances in which it does not.

As used herein, the term "substantially" means nearly completely, and includes completely. For example, a solution that is "substantially free" of a specified compound or material may be free of that compound or material, or may have a trace amount of that compound or material present, such as through unintended contamination or incomplete purification. A composition that has "substantially only" a provided list of components may consist of only those components, or have a trace amount of some other component present, or have one or more additional components that do not materially affect the properties of the composition. For example, a "substantially planar" surface may have minor defects, or embossed features that do not materially affect the overall planarity of the film.

2. Methods of Making Alkyl Dimethicone Compositions

In embodiments, the alkyl dimethicone compositions are formed using a method that results in 20% by weight or less olefinic impurities in the composition. In some embodiments, the alkyl dimethicone compositions are formed using a method that results in the substantial absence of olefinic impurities in the composition. In some embodiments, the alkyl dimethicone compositions are formed using a method that results in an amount of olefinic impurities in the composition that is not deleterious to the release layers of the invention. In some embodiments, olefinic impurities have deleterious effects on the release layers during or after extrusion, such as plasticizing the polyolefin material into which the alkyl dimethicone composition is added to form the release layer or transferring to the adhesive upon contact of the release layer with the adhesive.

The method of making the alkyl dimethicone compositions includes known methods employed to synthesize alkyl dimethicones, including the use of a platinum-based catalyst to carry out hydrosilylation reactions. In embodiments, two different α-olefins are employed in two separate hydrosilylation reactions, wherein the second hydrosilylation reaction is carried out using an α-olefin that is volatile at temperatures below which the alkyl dimethicone compound formed is volatile or unstable to degradation.

In some embodiments, a methylhydrosilyl functional compound, such as a methylhydrosiloxane-dimethylsiloxane copolymer or a methylhydrosiloxane polymer, is employed as a starting material in the reactions. In other embodiments, one or more cyclic siloxane monomers such as octamethylcyclotetrasiloxane (D4), hexamethylcyclotrisiloxane (D3), 2,4,6,8-tetramethylcyclotetrasiloxane (D'4), 2,4,6-trimethylcyclotetrasiloxane (D'3), or other cyclic siloxane monomers having more than 4 siloxane moieties per ring are employed in a ring opening reaction either alone or in combination to form a methylhydrosilyl functional compound; that is, a methylhydrosiloxane polymer or a methylhydrosiloxane-dimethylsiloxane copolymer. For example, in some embodiments, a silanol terminated methylhydrosiloxane polymer or copolymer is employed in a ring-opening reaction with D3, D4, D'3, D'4, or a combination of two or more thereof, in order to build molecular weight, adjust hydride content, or both. In some embodiments, the methylhydrosiloxane polymer or methylhydrosiloxane-dimethylsiloxane copolymer used or formed is trimethylsiloxane terminated. In some such embodiments, an endcapping agent, for example a compound such as hexamethyldisiloxane or hexamethyldisilazane, is employed to limit molecular weight of the polymer and/or to "cap" the ends of the polymer with trimethylsilyl groups or some other nonreactive group. Endcapping eliminates or limits the presence of reactive silanol groups as the polymer terminal moiety.

In some embodiments, the ring opening reactions of cyclic siloxanes, optionally further employing hexamethyldisiloxane for endcapping, is accomplished by adding the components together in the presence of a strong protic acid catalyst. Suitable strong protic acid catalysts include, for example, sulfuric acid and hydrochloric acid. In other embodiments, the ring-opening reactions are accomplished using a base. In some embodiments, the components are heated; in other embodiments, no heat is added to accomplish the ring opening reaction. In some embodiments, the endcapping agent is added to the polymer after synthesis is accomplished. In some embodiments, a solvent is included in the reaction mixture; suitable solvents include benzene, toluene, xylene, tetrahydrofuran, or combinations of two or more solvents. In other embodiments, no solvent is employed; that is, the reaction is carried out neat. In some such embodiments, the polymer thus formed is used as-is for the hydrosilylation step; in other such embodiments, vacuum stripping is employed after the reaction is complete.

The methylhydrosilyl functional compounds, whether purchased or synthesized, are then functionalized with alkyl groups via hydrosilylation according to known methods. Addition of an α-olefin to the methylhydrosilyl functional compound in the presence of a platinum catalyst, such as Karstedt's catalyst (a platinum-divinyltetramethyldisiloxane complex), causes the addition of Si—H across the olefinic bond, resulting in an Si—C bond. In embodiments, useful methylhydrosilyl functional compounds employed in the hydrosilylation reaction have about 0.1 mole % to 20 mole % hydride functional repeat units, that is,

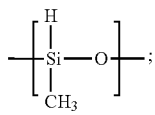

in other embodiments, the methylhydrosilyl functional compounds have about 1 mole % to 15 mole % hydride functional repeat units, or about 1 mole % to 10 mole % hydride functional repeat units, or about 2 mole % to 6 mole % hydride functional repeat units.

In some embodiments, the hydrosilylation reaction is carried out in two steps using two different α-olefins. Useful α-olefins for the first hydrosilylation reaction include linear or branched olefins having between 20 to 50 carbon atoms, or about 22 to 46 carbon atoms, or about 24 to 40 carbon atoms. In some embodiments, the olefins are a mixture of olefinic compounds having a range of molecular weights, degrees of branching, and in some embodiments include an amount of non-terminal olefinic functionality. For example, suitable materials for the first hydrosilylation reaction include ALPHAPLUS® C30+ and C30+HA, available from Chevron Phillips Chemical Company LP of The Woodlands, Tex. In embodiments, the first hydrosilylation reaction is carried out with the selected methylhydrosilyl functional compound as described above, and an amount of an α-olefin having between 20 to 50 carbon atoms in an amount equivalent to about 1.3 to 0.7 moles of α-olefin per mole of hydride functionality, or about 1.1 to 0.90 moles of α-olefin per mole of hydride functionality, or about 1.0 moles of α-olefin per mole of hydride functionality. A solvent is included in some embodiments in the first hydrosilylation reaction, wherein useful solvents include, for example heptane, hexane, cyclohexane, benzene, toluene, or xylene. The first hydrosilylation reaction mixture is heated in an inert atmosphere such as Argon, and a Pt based hydrosilylation catalyst is added to form the first reaction mixture. The first reaction mixture is then maintained at elevated temperature under inert atmosphere until substantially complete.

In embodiments, a second hydrosilylation step is then carried out to reduce the amount of Si—H bonds remaining without the necessity of adding excess α-olefin that is difficult to remove once substantially all of the Si—H bonds have been reacted. Thus, in embodiments, the second hydrosilylation reaction is carried out with a species of olefin that is strippable from the reaction mixture. The strippable olefin is any olefin that is capable of vaporizing at temperatures below which substantial degradation of the alkyl dimethicone product occurs; vaporization is optionally aided by employing reduced pressure. Suitable strippable olefins include linear or branched α-olefins having between 2 and 16 carbons, or between 4 and 12 carbons. In some embodiments, 1-octene is the strippable olefin. In some embodiments, the second hydrosilylation is carried out by adding between 0.1 and 1.0 equivalent of strippable olefin per mole of hydride functionality present in the selected methylhydrosilyl functional compound as described above (that is, prior to the first hydrosilylation reaction) to the first reaction mixture after the first reaction is substantially complete. Then an additional amount of Pt based hydrosilylation catalyst is added to form the second reaction mixture. In some embodiments, the inert atmosphere and elevated temperature conditions are maintained between the first and second reaction steps. The second reaction mixture is then maintained at elevated temperature under inert atmosphere until substantially complete. Then substantially all excess strippable olefin is removed from the second reaction mixture, along with any additional solvent employed, by a conventional evaporative technique such as vacuum distillation, wiped film evaporation, and the like.

Using the two-step hydrosilylation technique avoids the necessity of employing an excess of an α-olefin having more than 20 carbons in order to achieve complete reaction of all hydrosiloxane moieties. It is understood by those of skill that hydrosilylation reactions typically require an excess of α-olefin in order to achieve reaction of substantially all Si—H bonds. However, providing an excess of olefin having 20 or more carbons leaves excess olefin that cannot be removed except by, e.g., multiple recrystallizations or other labor intensive purification steps. Instead, in the first hydrosilylation step an amount of a first α-olefin is employed wherein substantially all of the olefin is used up, leaving some amount of hydrosiloxane functionality; then in the second step a molar excess of relatively low molecular weight α-olefin is employed to react all remaining hydrosiloxane functionality and the excess is simply evaporated from the reaction product, for example by vacuum stripping, along with the optional solvent present in the reaction mixture. In this manner, an alkyl dimethicone composition is formed having minor amounts of impurities. In some embodiments an alkyl dimethicone composition is formed that is substantially free of impurities. The alkyl dimethicone compositions are used as-is in blending with a thermoplastic resin to form one or more release layers.

It will be appreciated that in embodiments, the alkyl dimethicone compositions have significantly lower amounts of certain impurities compared to many commercially available alkyl dimethicones or alkyl dimethicones formed using conventional techniques. For example, the alkyl dimethicone compositions have less residual unreacted α-olefin compared to many commercial products. It is well understood by those of skill that an excess of olefin is necessary in a hydrosilylation reaction in order to result in the maximum percent yield of reacted Si—H bonds. Where, as here, the hydrosilylation reaction employs olefins having 20 to 50 carbons, excess olefin is very difficult to remove. For example, in some cases multiple recrystallizations are carried out to remove unreacted olefin. In the case of many commercial materials, these olefins are simply sold as part of the product. Such materials contain a lower weight percent of "active" release agent per unit of weight and necessitate addition of higher amounts of material to get the desired level of release. Additionally, the alkyl dimethicones of the invention possess a high relative amount of silicone (dimethylsiloxane) functionality compared to alkyl content, which in turn leads to lower release force per unit of weight incorporated. In turn, this allows less weight of alkyl dimethicone to be employed to reach a target release force compared to use of alkyl dimethicones having a lower level of dimethylsiloxane functionality.

Further, unreacted olefin is, in some embodiments, mobile in the target formulation, and may plasticize a thermoplastic composition, cause phase separation or another instability in a formulation; or, where the alkyl dimethicone is employed in a release layer, transfer to the pressure sensitive adhesive that is contacted with the release layer.

The alternative to reducing residual olefin content in the alkyl dimethicone is to provide a lower amount, for example an equimolar amount, of olefin based on the known amount of Si—H bonds in carrying out the hydrosilylation reaction.

While this approach results in significantly less unreacted olefin at the end of the hydrosilylation reaction, it is well known that the reaction does not proceed to completion, therefore some amount of residual Si—H bonds will be present in the final product. While not being limited by theory, we believe that the presence of a threshold amount of Si—H functionality is responsible for deleterious effects observed both during thermal processing of the alkyl dimethicone as well as upon aging of release layers in contact with pressure sensitive adhesive materials.

We have found a way to provide a sufficient amount of the 20-50 carbon alkyl chain functionality needed to impart "anchoring" of alkyl dimethicones in olefin extrudates, while avoiding both large excesses of unreacted 20-50 carbon olefin and unreacted Si—H functionality. These differences translate to several distinct benefits that are realized in the applications of the alkyl dimethicones, both during thermal processing thereof and in performance of the release layers formed therewith. First, because of the absence of significant amounts of unreacted olefin present in the dimethicone compositions, the compositions have a higher percent of "active" release agent per unit of weight compared to, e.g., commercially available alkyl dimethicones or other alkyl dimethicones formed using conventional techniques. This in turn leads to the ability of the user to employ a commensurately lower weight percent of as-is alkyl dimethicone composition as compared to a commercially obtained alkyl dimethicone in order to reach the targeted release properties. Second, in some embodiments the olefinic impurities present in commercially available alkyl dimethicones or alkyl dimethicones formed using conventional techniques have deleterious effects upon formulations in which the alkyl dimethicone is incorporated. For example, in some embodiments the olefins migrate into the pressure sensitive adhesive placed in contact with the release layer during use of the release layer. Third, while not wishing to be bound by theory, we believe that the absence of significant amounts of Si—H bonds in the alkyl dimethicone compositions leads to greater thermal stability during extrusion processing, evidenced, for example, by the lack of gel formation during preheating and conveyance to the extruder barrel. Fourth, while not wishing to be bound by theory, we believe that the absence of significant amounts of Si—H bonds in the alkyl dimethicone compositions leads to greater long term stability of the resulting release layers, as evidenced by aging studies of release layers in contact with pressure sensitive adhesives. These and other advantages of the alkyl dimethicone compositions will be readily recognized by one of skill in the art.

3. Release Layers and Methods of Making

In some embodiments, the alkyl dimethicone compositions described above are included in the release layers of the invention. In some embodiments, alkyl dimethicones from other sources, such as commercial sources, are employed to form the release layers of the invention. Alkyl dimethicones useful for forming the release layers include, for example, compounds having the general structure I,

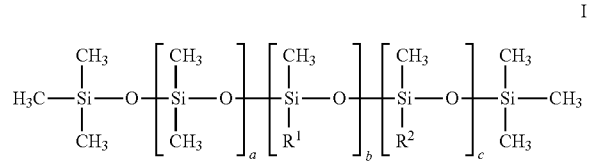

I wherein the sum of (a+b+c) is between about 100 and 1000, for example between about 200 and 500 or between about 300 and 400; the ratio of a to the sum of (b+c) is about 99.9:0.1 to 80:20, or about 99:1 to 85:15, or about 99:1 to 90:10, or about 99:1 to 92:8, or about 98:2 to 93:7 or about or about 98:2 to 94:6; $R^1$ is a linear, branched, or cyclic alkyl group having between 20 and 50 carbon atoms, for example about 22 to 46 carbon atoms, or about 24 to 40 carbon atoms; $R^2$ is a linear, branched, or cyclic alkyl or alkaryl group having between 2 and 16 carbons, for example about 4 to 16, or about 5 to 12, or about 6, to 10, or about 8 carbon atoms; and the structure is a random, block, or blocky structure. In some embodiments, the ratio of a to (b+c) in conjunction with the number of carbons in the $R^1$ and $R^2$ groups result in an alkyl dimethicones having greater than about 50 wt % dimethyl siloxane (a) units, or in embodiments greater than about 60 wt % dimethyl siloxane units. In some embodiments, c is 0. In some embodiments, the sum of (a+b+c) is about 300 to 400 and the ratio of a to the sum of (b+c) is about 98:2 to 94:6. In embodiments, the alkyl dimethicone is a blend of two or more species thereof, wherein the species differ in terms of the sum of (a+b+c), the ratio of a to the sum of (b+c), the value of c, or in two or more such parameters. In some embodiments, structure I is a random structure. In some embodiments, $R^1$ is a linear alkyl group. In some embodiments, $R^2$ is a linear alkyl group.

The alkyl dimethicones are blended with a thermoplastic resin using conventional melt processes and apparatuses to form a release blend. The thermoplastic resin employed to form the release blend is not particularly limited; however, the thermoplastic resin must be sufficiently compatible to form a release blend in a melt blending process with the alkyl dimethicones defined above, wherein the release blend is capable of forming a release layer according to the methods of the invention. Suitable thermoplastic resins employed to form the release blends include, for example, linear or branched polyolefins. Exemplary polyolefins include, but are not limited to polyethylene, polypropylene, poly-α-olefins, and copolymers thereof, including low density polyethylene (LDPE), high density polyethylene (HDPE), linear low density polyethylene (LLDPE), ultra-high density polyethylene (UH-DPE), and polyethylene-polypropylene copolymers, as well as polyolefin copolymers having non-olefin content (that is, content derived from monomers that are not olefins). The non-olefin content of polyolefin polymers employed in some embodiments is not particularly limited, but includes, for example, 1-5 wt % of acrylic acid, or methacrylic acid functionality, including sodium, zinc, or calcium salts of the acid functionality; 1-5 wt % of an anhydride functionality, such as maleic anhydride, or the corresponding ring-opened carboxylate functionality; and the like. In some embodiments, blends of polyolefins containing non-polyolefin content are blended at various ratios with polyolefins in order to provide a targeted level of non-olefin content. Also useful are polymers and copolymers of conjugated diene monomers, such as polybutadiene or isoprene; and blends or alloys of these. Also useful are polyesters, polyurethanes, polyamides, polystyrene and copolymers thereof, including block copolymers thereof, and the like, and their blends or alloys with polyolefins and copolymers thereof. Useful polymers and blends further include recycled blends of commingled thermoplastic waste streams, and blends of recycled polymers with virgin polymers.

It will be appreciated that the alkyl dimethicones employed have a ratio of $C_{20}$-$C_{50}$ alkyl functionality to dimethylsiloxane functionality that allows one of skill to form a release layer having "premium" release properties by extrusion blending with no further post-treatment. It will be appreciated that the ratio of $C_{20}$-$C_{50}$ alkyl functionality to dimethylsiloxane functionality of the alkyl dimethicones further allows one of skill to form a release layer that does not transfer alkyl dimethicone to pressure sensitive adhesives in amount sufficient to cause significant loss of adhesion of the adhesive upon removal of the adhesive from the release layer and subsequent application of the adhesive to the intended substrate. That is, the amount of $C_{20}$-$C_{50}$ alkyl functionality is ideal to provide sufficient anchoring of the alkyl dimethicone in the release layers, while the amount of dimethyl siloxane functionality is sufficient to provide excellent migration properties of the alkyl dimethicone in the melt, negating the necessity of post treatments to gain the desired level of release intended.

In embodiments, the alkyl dimethicones are blended with the thermoplastic resins in an amount of about 0.1 wt % to 10 wt % based on the total weight of the release blend, or about 0.5 wt % to 5 wt % or about 1 wt % to 4 wt % based on the total weight of the release blend. In other embodiments, the alkyl dimethicones are compounded initially in a masterbatch form, and the masterbatch is later extrusion blended to form a final release blend having the above recited amounts of alkyl dimethicone. In some embodiments, masterbatches are simply extrusion blends of a thermoplastic and the alkyl dimethicone at concentrations over 10 wt %, for example between about 10 wt % and 25 wt %, or between 15 wt % and 20 wt %, wherein the masterbatch is processed in a form that is easily storable or shippable, such as pellets, flakes, granules, and the like. The masterbatch is later extrusion blended with an additional amount of the same thermoplastic employed in forming the masterbatch, or with a thermoplastic that is capable of intimately blending with the thermoplastic employed in forming the masterbatch, in a selected ratio to provide the intended final concentration of alkyl dimethicone in the release layer. In other embodiments, a masterbatch is formed by solution coating pellets, flakes, or granules of a thermoplastic with a solution of the alkyl dimethicone, and drying the solvent; the masterbatch is later blended as described with a thermoplastic to form release layers having the selected amount of alkyl dimethicone.

In some embodiments, the release blends further include one or more additives. For example, in embodiments, the additives include one or more UV stabilizers, thermal stabilizers, fillers, colorants, UV or fluorescent dyes, antimicrobial compositions, crosslinkers, solvents, plasticizers, mixtures of two or more thereof, and the like. The one or more additives are present in the release blend in amounts ranging from about 0.01 wt % to 50 wt % based on the total weight of the melt blend, or about 0.01 wt % to 10 wt % based on the total amount of the melt blend as will depend on the type of additive and the final properties of the release blend desired. The means of adding the one or more additives is not particularly limited and additives are added to the release blends using conventional methods as will be understood by the skilled artisan.

The release blends, which include at least a thermoplastic resin and an alkyl dimethicone, are formed using conventional melt blending equipment. Any equipment useful for the melt blending of polymers or of a polymer with one or more additives is useful herein to form the release blends. Suitable equipment includes kneaders and extruders. Extruders include single screw and twin screw extruders. Temperature profiles employed to form the release blends are selected based on the type of thermoplastic resin employed to form the release blends and often according to the supplier's guidelines for melt processing. In some embodiments, it is desirable to employ a twin screw extruder to form a masterbatch, or a release layer, wherein an intensive mixing screw design is employed. Such screw designs lead, in embodiments, to optimal mixing of the alkyl dimethicone with the thermoplastic in the extruder barrel. The selected alkyl dimethicone is added as-is or in masterbatch form to the thermoplastic resin, optionally in addition to one or more additives, to form a release blend. The alkyl dimethicones are added, in various embodiments, as a liquid or a solid to the thermoplastic resin to form a release layer or a masterbatch. Liquid delivery is accomplished by preheating the alkyl dimethicone, for example via a heated delivery means such as a heated gear pump and transfer line leading to the apparatus, where the molten thermoplastic resin is contacted with the liquid alkyl dimethicone and the components are blended to form the release blend or the masterbatch.

In some embodiments, solid delivery to form a release layer or a masterbatch is accomplished by feeding the thermoplastic resin and the alkyl dimethicone separately into the melt blending apparatus, wherein the alkyl dimethicone is in a flake, pellet, chip, granule, or powder form. In other embodiments, the solid alkyl dimethicone is admixed with pellets of the thermoplastic resin and the admixture is fed into the melt blending apparatus.

The release blends are used to make release layers. In some embodiments, a release layer is formed as a single layer. In some embodiments, the release blends are coextruded with one or more additional layers to form a multilayer construction, wherein the one or more additional layers include at least one layer contacting the release layer that is substantially free of alkyl dimethicone content. Each of the one or more additional layers in a coextruded release construction include one or more thermoplastic resins, wherein the useful thermoplastic resins include any of those described above. In some embodiments, one or more additional layers include the same thermoplastic resin or blend of thermoplastic resins used to form the release blend. In some embodiments, one or more additional layers include one or more thermoplastic resins that are different from one or more of the thermoplastic resins used to form the release blend. In embodiments, one or more additional layers include one or more additives, such as any of those additives described above. The additive or mixture thereof may be the same or different from the one or more additives included in the release blend. For example, in one representative embodiment, the release layer is free of fillers and colorants, whereas an additional layer includes a filler and a colorant. Other examples will be readily apparent to one of skill. In some embodiments, one or more additional layers of a multilayer construction are tie layers. Tie layers are employed in some embodiments to impart or improve layer-to-layer adhesion in multilayer constructions, or to impart adhesion between a layer and a substrate onto which the layer is extruded (that is, an extrusion coated layer). For example, anhydride, hydroxyl, and carboxyl functional polymers such as ethylene-vinyl acetate copolymers, ethylene-vinyl alcohol copolymers, ethylene-acrylic acid copolymers, or ethylene-maleic anhydride copolymers are commonly employed in tie layers to provide effective interlayer adhesion between, e.g., a polyolefin layer and a layer including a more polar polymer, such as a polyester; or between two different polyolefin layers. Any such polymers are suitably employed in conjunction with the release layers or multilayer constructions of the invention, further as selected by one of skill.

In some embodiments, polyolefins are mixed with functional olefin copolymers commonly employed as tie layers, and this blend is employed in a single layer or multilayer construction of the invention. Such blends exhibit melt adhesion to paper substrates, such as kraft paper, at lower extrusion temperatures than those required to gain melt adhesion of polyolefin to paper. For example, low density polyethylene is often coated onto paper substrates at exit temperatures of 300° C. to 350° C. or even higher; employing a lower temperature causes failure of the olefin to bond satisfactorily to the paper, wherein satisfactory bonding means that the olefin does not peel off the paper easily after cooling the extrusion coated paper to about 18° C. to 25° C. Employing a functional olefin copolymer:low density polyethylene blend weight ratio of about 5:95 to 60:40, or about 10:90 to 50:50, provides for acceptable adhesion of the blend to paper at exit temperatures of about 180° C. to 250° C., or 200° C. to 240° C. Representative examples of functional olefin copolymers that improve low-temperature melt adhesion to paper and also form extrudable blends with molten polyethylene include, for example, ethylene-vinyl acetate copolymers, ethylene-acrylic acid copolymers, ethylene-vinyl alcohol copolymers, and ethylene-maleic anhydride copolymers.

In some embodiments a functional olefin copolymer/olefin blend is mixed with an alkyl dimethicone to form a release layer, and the release layer is extrusion coated directly onto a paper substrate. In other embodiments, the functional olefin copolymer/olefin blend is one layer of a multilayer construction, wherein a second layer is the release layer. Multilayer constructions having two layers wherein the first layer is the functional olefin copolymer/olefin blend and the second layer is a olefin/alkyl dimethicone blend are further characterized by excellent interlayer adhesion between the first and second layers over a range of exit temperatures not exceeding 250° C.

The composition of the one or more additional layers in a multilayer construction are not particularly limited except that the blends employed to form the one or more additional layers must be melt processable and coextrudable to form the multilayer constructions using the methods of the invention. The thicknesses of the layers, and the ratio of layer thickness of the one or more additional layers to the release layer, are not particularly limited and will depend on the targeted end use for a multilayer construction.

Coextrusion is well known in the art as the process of extruding two or more materials through a single die, with a feedblock or die having two or more orifices arranged so that the extrudates merge and contact each other in a laminar structure prior to cooling and solidifying. The laminar structure includes two or more layers, wherein at least one major surface of each layer is disposed in touching relation to a major surface of another layer. Each material is fed to the die from a separate extruder. In embodiments, the orifices are arranged so that each extruder supplies one layer of the same material to the feedblock or die. The feedblock or die is capable of forming two, three, or more laminar layers, with molten materials flowing from source extruders to the orifices in a nearly endless range of configurations. In various embodiments, coextrusion is employed in blown film formation, cast film formation, and extrusion coating of a substrate that is passed beneath the laminar coextrudate as it exits the die. An advantage of coextrusion is that each layer of the laminate imparts a desired characteristic property, such as stiffness, heat-sealability, impermeability or resistance to some environment, the combination of which would be difficult to attain with any single material.

In some embodiments, coextrusion is employed to form a two layer construction, wherein one layer of the construction is a release layer, and the other layer is substantially free of alkyl dimethicone. While not limited to such constructions, the methods of the invention are suitably represented by the principles employed in forming a two layer construction. Employing coextrusion, the location and migration of the alkyl dimethicone in the release layer is controlled in such a manner that the alkyl dimethicone is concentrated at the air-release layer interface by the time the laminar construction is solidified. The alkyl dimethicone is mobile in the molten polymer of the release blend and is capable of migrating within the release layer during the time the layer is molten. Without being limited by theory, we believe that by contacting the molten release layer with the internal metal surfaces of the feedblock and/or die, the alkyl dimethicone becomes concentrated at the release layer-metal interface. In this manner, the release composition is already partially, or in some embodiments substantially, at the air-release layer interface upon exiting the die. Alternatively or in addition to migration toward the release layer-metal interface, migration of the alkyl dimethicone toward the release layer-air interface occurs for some period of time after the multilayer construction leaves the die. The end result of coextrusion and contact of the release layer with an additional layer within the multilayer die is that when the resulting layered construction is solidified, an amount of alkyl dimethicone is located at the surface of the release layer in an amount sufficient to give excellent release characteristics, without further treatment such as annealing (heating the multilayer construction to promote further migration).

The example of the two layer construction is representative in exhibiting this effect. Multilayer films having three of more layers also exhibit the effect of providing excellent release characteristics using the same or similar conditions and contact within a coextrusion die without limitation as to the number of layers or their composition. The number of layers and the composition of those layers is limited solely by conventional considerations surrounding multilayer constructions such as flow instability, layer to layer adhesion and compatibility, and the like. It will be appreciated that the methods of the invention rely on the interplay of the composition of the release layer with the method of coextruding the release layer with at least one additional layer that contacts the release layer in the molten state, and forming a layered construction wherein release layer has one major surface thereof that has an air-release layer interface upon exiting the die.

The methods of the invention are suitable for forming release constructions. The release constructions are single layer constructions, two layer constructions, three layer constructions, or any additional number of layers in a multilayer construction according to the particular needs of the skilled artisan and judicious selection of layer components. In some embodiments, the release constructions include a substrate, wherein the substrate is an article, a sheet, a film, or a layer that is not coextruded along with the release layer construction, but rather is provided for the purpose of extrusion coating a release layer or multilayer construction thereon. Examples of suitable substrates include paper or other cellulose based substrates such as cardboard, thermoset substrates, nonwoven media, foamed media, irregularly shaped articles, articles, sheets, or layers having an adhesive coated thereon, elastic members, and the like. Suitable examples of paper substrates include kraft paper, alkaline paper, antique paper, bond paper, glassine paper, newsprint paper; coated and uncoated versions thereof; and calendared and uncalendared versions thereof. In some embodiments, a substrate is surface treated to increase effective adhesion of the release layer or multilayer construction thereto. Examples of suitable surface treatments include corona treatment, flame treatment, plasma treatment, physical roughening such as sanding or sandblasting, solvent coating of tie layer-type polymers, chemical etching, embossing, and the like.

In an exemplary set of embodiments, a two layer construction is coextruded and dispensed from the extrusion die onto kraft paper. In some such embodiments, the layers are coated in a configuration wherein the first layer contacts the paper, and the second layer is the release layer, wherein the first layer is disposed between the release layer and the paper. In some such embodiments, the thermoplastic included in the release layer is the same thermoplastic as included in the first layer and the first layer does not include alkyl dimethicone as dispensed via the extruder feed. In another representative embodiment, a three layer construction has a first layer, a second layer that is a release layer, and one or more additional layers disposed between the first and second layers that are tie layers, that is, layers that provide for interlayer adhesion to effectively adhere the first and second layers. In some such embodiments, the three layer construction is disposed on a substrate. In some such embodiments, the first layer is further functionalized, or includes one or more additional materials, to increase adhesion of the first layer to the substrate.

In yet another set of representative embodiments, a two layer construction is formed wherein a first layer is the release layer, and a second layer is an extrudable pressure sensitive adhesive composition. In some such embodiments, the construction is wound upon itself in a tape roll format. In yet another representative embodiment, a three layer construction is formed wherein a first layer is a release layer, a second layer contiguous to the release layer acts as a tape backing, and a third layer contiguous to the second layer is an extrudable adhesive composition. In some such an embodiment, the construction is wound upon itself in a tape roll format. In a related embodiment, one or more tie layers are disposed between the release layer and the tape backing layer, or between the tape backing layer and the adhesive layer, or between both the release layer/tape backing layer and the tape backing layer/adhesive layer to increase layer-to-layer adhesion.

In yet another set of representative embodiments, a multilayer construction is formed having two or more layers, one of which is the release layer. After formation of the multilayer construction, a pressure sensitive adhesive (PSA) composition is formed atop the major surface of the release layer. For example, the PSA is applied by coating a liquid PSA formulation directly onto the release layer surface and the PSA is solidified. Solidification includes, for example, radiation curing of a mixture of radiation polymerizable monomers, or evaporation of solvent from a PSA in solution. In embodiments where evaporation of solvent is required, heat is further employed in the application of the PSA to the release layer surface. In some such embodiments, a backing layer is subsequently applied to the major surface of the solidified PSA layer to form a completed tape construction; the release layer is peeled away from the PSA when a user is ready to apply the PSA to a target surface. In such embodiments where radiation polymerization is employed, a PSA is formed atop the major surface of the release layer by coating a formulation including a mixture of radiation curable monomers—such as acrylic acid and an alkyl acrylate—on top of the release layer, and exposing the monomer mixture to radiation in order to polymerize and optionally crosslink the monomers to form a PSA. A photoinitiator is employed in some such embodiments to facilitate initiation of the polymerization. A tape backing layer is added to the major surface of the PSA either after cure, or before cure provided that the backing is transparent to the type of radiation employed. In still other embodiments, a PSA is formed by coating a formulation including a mixture of radiation curable monomers on a backing that is not a release layer surface, contacting the formulation with a release layer surface, and exposing the monomer mixture to radiation in order to polymerize and optionally crosslink the monomers to form a PSA. In such embodiments, the release construction including the release layer is at least partially transparent to the radiation employed to polymerize the monomer mixture. In some embodiments where radiation polymerization is employed, the monomer mixture further includes one or more polymers or prepolymers in order to provide increased viscosity.

In yet another set of representative embodiments, the release layer is embossed with a pattern to form an embossed release layer. The embossed release layer is a single layer, part of a multilayer construction, a single or multilayer construction on a substrate (such as a paper or film substrate). Embossed or microembossed patterns useful in conjunction with the release layers of the invention are not particularly limited. In some embodiments, the embossed pattern is the same as or similar to the patterns described U.S. Pat. Nos. 5,362,516; 5,897,930; and 6,197,397. In some embodiments, an adhesive is applied in liquid form to the embossed release layer and subsequently solidified by polymerization, crosslinking, cooling, or solvent evaporation such that the inverse of the pattern of the embossed release layer is imparted to the adhesive. In some such embodiments, the adhesive is thereby provided with, e.g., channels for air bleed during application of the adhesive to the intended, or some other functionality. In some embodiments, an embossed release layer is further coated with a bead composition before or after the embossing; in some embodiments such embossed and coated release layers are further embossed with, e.g., air bleed channel pattern. Suitable bead compositions, as well as methods of coating embossed release liners, are described, for example, in U.S. Pat. No. 5,362,516. The beads, when subsequently contacted with an adhesive, adhere to the adhesive when the adhesive is peeled off the release layer. The beads impart repositionability or control of initial adhesion level when the adhesive is subsequently contacted with the intended adherend.

The methods of the invention are characterized by the absence of the necessity to carry out any post-treatment of the release layers in order to form a release surface. Thus, a simple extrusion, coextrusion, extrusion coating, and optional stretching, embossing, or the like, are adequate to form a release surface from a molten release blend without any annealing or other special operation to improve or bring about the release characteristics of the release layer. The release layers have stable release properties that are unaffected by environmental factors such as varying humidity, or by the tendency to transfer alkyl dimethicone from the release layer to an adhesive contacted with the surface of the release layer.

In some conventional techniques employed to form release surfaces using alkyl dimethicones, annealing is necessary in order to form release surfaces wherein adhesion to a PSA is less than about 100 g/cm. Annealing is a thermal post-treatment of a film having an alkyl dimethicone incorporated therein wherein the film is held at an elevated temperature for a period of time in order to form a film surface having release characteristics. In some embodiments the conventional techniques of annealing include holding a film at temperatures of about 100° C. to 150° C. for about 10 minutes to 30 minutes. In other conventional techniques employed to form release surfaces using alkyl dimethicones, the molten film is passed over a chill roll having a low surface energy surface—such as a fluoropolymer—in order to form release surfaces wherein adhesion to a PSA is less than about 100 g/cm. No post-treatment or special equipment is employed to form the release layers of the invention, wherein the release layers have adhesion to a PSA of about 1500 g/cm or less, in some embodiments between 0 g/cm and 10 g/cm; between about 10 g/cm and 50 g/cm, or between 50 g/cm and up to about 1400 g/cm, for example in some embodiments, between about 500 g/cm and 1200 g/cm when measured by contacting an adhesive tape strip 2.54 cm wide after aging the contacted adhesive and release layer for 7 days at 23° C./50% relative humidity (RH), or for 7 days at 50° C. followed by one day at 23° C./50% RH, followed by 180° peel testing at 228.6 cm/min.

The thickness of the various single layer and multilayer constructions described herein is not particularly limited, and is selected based on the particular end use and further as limited by the constraints of melt processing equipment employed to form and optionally stretch the constructions prior to solidification thereof. In some such embodiments, the layers—either as single layers or as a layer in a multilayered construction—are between about 0.1 µm and 1 cm thick as extruded. In some embodiments, layers are extruded or coextruded and then stretched, either by employing a blown film apparatus, or by one or two-dimensional tentering apparatuses that stretch the extruded film in a downweb direction, crossweb direction, or both. In such embodiments, the final thickness of the layers individually and the thickness of the overall construction is less than that of the layers or the overall construction as it exits the die. For example, in embodiments, the layers and the overall construction when stretched are about 90% to 0.1% of the thickness of the layers or the overall construction as it leaves the die, or about 50% to 0.5%, or about 10% to 0.1% of the thickness of the layers or the overall construction as it leaves the die.

The composition of the release layer, and therefore the release blend, is optimized for performance during the formation of the release layer as well as performance of the final construction in its intended application as a release construction. In some embodiments, in the intended final application, the final release construction is subsequently contacted with a pressure sensitive adhesive article wherein the adhesive article is subsequently released from the release layer cleanly and substantially without transferring, the alkyl dimethicone across the adhesive-release layer interface to significantly, or substantially, reduce adhesion level of the adhesive to its target surface.

The selection of release blend components therefore affects the formation and performance of the release layer in three ways: the rate of migration of the alkyl dimethicone within the release blend and the release layer; the release performance of the alkyl dimethicone when located at the surface of the release layer; and the ability of the alkyl dimethicone to remain sufficiently associated, or anchored, to the release layer to substantially avoid transfer of the alkyl dimethicone to an adhesive article placed in contact with the release layer surface.

Migration of the alkyl dimethicone requires a balance of compatibility in the molten state, such that gross or large-scale phase separation is avoided during extrusion in order to maintain a stable molten flow, and the ability of the alkyl dimethicone to migrate at a sufficient rate during laminar flow and prior to cooling to enable the release layer to provide release characteristics. In embodiments, a twin screw extruder having a high intensity mixing configuration is employed to process the mixture of alkyl dimethicone and thermoplastic resin or resin blend. It will be appreciated by those of skill that alkyl dimethicones having the chemical structure I as defined above are well suited for such a balance of compatibility when the release blend includes a major portion of a polyolefin, as polyolefin is defined above. We have found that alkyl dimethicones having structure I shown above are useful in conjunction with release blends including a major portion of a polyolefin to provide for effective migration rates during release layer formation in a multilayer construction. The blends including a major portion of a polyolefin include blends wherein about 51% to 100% by weight of the total thermoplastic content is a polyolefin, or about 75% to 100% by weight, or about 80% to 100% by weight, or even 90% to 100% by weight of the total thermoplastic resin content is polyolefin. In some embodiments, substantially all of the thermoplastic resin content of the release blend is polyolefin. The polyolefin is, in some embodiments, a blend of two or more polyolefins having different monomer content, different molecular weights, stereochemistry, degrees of branching, polydispersity, melt indices, and the like. In some embodiments, polyolefin includes copolymers of an olefin and a non-olefinic monomer such as acrylic acid or an ester thereof, methacrylic acid or an ester thereof, maleic anhydride, and the like.

Release performance of the release layers of the invention toward pressure sensitive adhesives is excellent for a wide variety of PSA chemistries. Many different types of PSA chemistries are available commercially or experimentally, including acrylate based PSAs and rubber based PSAs for example; it is an advantage of the release layers of the invention that a variety of PSA chemistries are addressed by the release layers in that the release levels are achieved by employing the stated range of alkyl dimethicone in the release layer using the processes described. Release force depends on the type of PSA employed, components of the release layer, and amount of alkyl dimethicone employed in the release layer. It is an advantage of the release layers of the invention that a broad range of release properties are easily achieved by tailoring the type and amount of alkyl dimethicone employed as well as the nature of the thermoplastic employed in the release blends. Liner-like release, that is, release levels of about 0 to 50 g/cm of peel force of adhesive from the release layers of the invention (measured at a peel angle of 180° at 228.6 cm/min), are easily reached, as are release levels employed in many low adhesive backsize applications, that is, about 50 g/cm or more (also measured at a peel angle of 180° at 228.6 cm/min) "Low adhesion backsize" is a term of art employed to describe a release coating or layer present on the major surface of a tape article opposite the PSA-bearing side, such that the tape can be wound upon itself in a roll format and subsequently unrolled; such applications typically require tighter release than many tape/liner combinations in order to prevent the tape roll from becoming unintentionally disassembled with undue ease; in some embodiments, the release is a modified release. In such applications, tailorable release is achieved using the materials and methods of the invention, wherein the desired level of release is imparted with ease depending on the application and the PSA employed. Premium release levels are achieved with similar ease.

For LDPE/alkyl dimethicone release layers having less than 10 wt % alkyl dimethicone, for example less than about 5 wt % alkyl dimethicone, for example about 0.5 wt % to 4.5 wt % alkyl dimethicone, or about 1 wt % to 4 wt % alkyl dimethicone, or about 0.5 wt % to 2 wt % alkyl dimethicone, release force is about 0 g/cm to 1500 g/cm, or about 1 g/cm to 100 g/cm, or about 200 g/cm to 1300 g/cm, or about 400 g/cm to 1100 g/cm, or about 0 g/cm to 50 g/cm, or about 1 g/cm to 25 g/cm, or about 50 g/cm to 100 g/cm, or about 100 g/cm to 500 g/cm, or about 500 g/cm to 1500 g/cm, or about 1000 g/cm to 1500 g/cm, when measured by contacting an adhesive tape strip 2.54 cm wide after aging the contacted adhesive and release layer for 7 days at 23° C./50% relative humidity (RH), or for 7 days at 50° C. followed by one day at 23° C./50% RH, followed by 180° peel testing at 228.6 cm/min (90 inches/min).

Readhesion performance of PSA tapes, that is, adhesion of the PSA to a target surface after removal from the release surface of the multilayer constructions, is also excellent for a wide variety of PSA chemistries. Readhesion is measured as a percent of the measured adhesion of the PSA to the target substrate without having first been applied to a release layer.

adhesive article placed in contact with the release layer surface is another key aspect of the performance of the release layers of the invention. Another key aspect of performance is that the alkyl dimethicones do not cause substantial transfer of adhesive materials, such as plasticizers or tackifiers, into the release layer.

EXPERIMENTAL SECTION

Materials used in the various Examples below are shown in Table 1.

TABLE 1

Material and supplier information.

| Material | Description | Supplier | Location |
|---|---|---|---|
| HMS-082 | 7-8% methylhydrosiloxane-dimethyl siloxane copolymer, trimethylsiloxane terminated, 110-150 cSt | Gelest, Inc. | Morrisville, PA |
| HMS-151 | 15-18% methylhydrosiloxane-dimethyl siloxane copolymer, trimethylsiloxane terminated, 25-35 cSt | Gelest, Inc. | Morrisville, PA |
| PMHS | Polymethylhydrosiloxane, 30 cSt | Sigma-Aldrich Chemical Co. | Milwaukee, WI |
| D4 | Octamethylcyclotetrasiloxane | Gelest, Inc. | Morrisville, PA |
| D'4 | 2,4,6,8-tetramethylcyclotetrasiloxane | Gelest, Inc. | Morrisville, PA |
| C30 + HA | ALPHAPLUS ® C30+HA normal α-olefin, C30+ fraction; | Chevron Phillips | The Woodlands, TX |
| HMDS | Hexamethyldisiloxane | Gelest, Inc. | Morrisville, PA |
| Karstedt's Catalyst | Pt-divinyltetramethyldisiloxane complex, 2.1-2.4% in xylenes | Gelest, Inc. | Morrisville, PA |
| DARCO ® G-60 | Activated charcoal | EM Science | Gibbstown, NY |
| 0.6 μm filter cartridge | Meissner CSMF 0.6-442 0.6 μm ALPHA ® PP Microfiber filter cartridge | Purimetrics | Edina, MN |
| NA217000 | 0.923 g/cc polyethylene, MI = 5.6 | LyondellBasell | Houston, TX |
| NA219000 | 0.923 g/cc polyethylene, MI = 10 | LyondellBasell | Houston, TX |
| Tape A | 845 Book Tape | 3M Corporation | Maplewood, MN |
| Tape B | 850 Tape | 3M Corp. | Maplewood, MN |
| Tape C | SCOTCHCAL ® Graphics marking film 7725-13 | 3M Corp. | Maplewood, MN |
| Adhesive D | Solvent-based acrylate adhesive formulation similar to Pressure Sensitive Adhesive Solution 1 in U.S. Pat. No. 6,197,397 | N/A | N/A |
| Tape E | 3M SCOTCH ® Tough 2835 Extreme Hold Duct Tape | 3M Corp. | Maplewood, MN |
| Ampacet UV PE MB 10407 | UV stabilizer | Ampacet Corp. | Tarrytown, NY |
| Polyone Silver Black #1 | Pigment | Polyone Corp. | Avon Lake, OH |
| Polyone 3800 Black PEC | Pigment | Polyone Corp. | Avon Lake, OH |
| Control Liner | Loparex 4000D premium release PCK liner | Loparex LLC | Cary, NC |

Thus, where release performance is measured according to the above described protocol, readhesion of PSAs to a target substrate immediately after the release test is between about 50% to 99%, or between about 60% to 99%, or between about 75% to 99% of the adhesion of the PSA tape to the target substrate without first being applied to the release surface of the multilayer constructions. The high readhesion levels observed in many embodiments of the release layers described herein is due to low to substantially no transfer of release materials to the PSAs, as well as a substantial lack of transfer of PSA from the tape to the release layer. Thus, in embodiments, the ability of the alkyl dimethicone to remain sufficiently associated with, or anchored to, the release layer to substantially avoid transfer of the alkyl dimethicone to an Examples 1-11

Alkyl dimethicones were synthesized in a two step process. In the first step, a silicone hydride fluid is synthesized, and in the second step hydrosilylation is employed to add Si—H across the unsaturated site of an α-olefin.

Synthesis of Silicone Hydrides.

For syntheses A-J in Table 2, a 1.9 L plastic narrow-neck bottle was charged with the hydride source, endblocker and D4 in the amounts indicated in Table 2. Then DARCO® G-60 (8.0 g) and sulfuric acid (conc., 1.6 g) were added, and the bottle was placed on a shaker for 24 hours. The viscous contents of the bottle were transferred to a stainless steel pressure vessel and filtered through a 0.6 micron filter cartridge under 15-30 psi nitrogen pressure, and the resulting clear fluids were vacuum stripped to >99.7% solids on a rolled film evaporator (RFE) KDL-6-1S unit (obtained from Chemtech Services Inc. of Lockport, Ill.), which is a 0.06 m² laboratory short path distillation system. The evaporator was modified from the original glass body to one made of stainless steel. Typical stripping conditions were 150° C. oil temp, 5° C. condenser temp, 0.13 kPa (1 torr) vacuum, and 15-20 mL/min. In the synthesis of hydride K in Table 2, a large capacity glass-lined stainless steel vessel was employed in both the synthesis and stripping steps.

Percent solids of the silicone hydrides were determined by placing a sample in an open vessel in an exhaust oven set to 150° C. for 1 hour to result in a dry sample. After allowing the samples to cool to ambient temperature, percent solids were calculated as the weight of the dry sample as a percent of the weight of the sample prior to drying. Viscosity was determined at ambient temperature using a Brookfield DV-E unit (obtained from Brookfield Engineering Laboratories of Middleboro, Mass.) equipped with spindle RV03. The mole percent of silicone hydride repeat units,

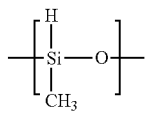

was determined by ¹H NMR (300 MHz) in CDCl₃. Viscosity and mole percent of silicone hydride units are shown for each sample in Table 2.

19 h at which time the contents were sampled and analyzed by ¹H NMR (300 MHz, d₈-THF) to confirm complete consumption of the α-olefin (C30+HA). If any α-olefin remained, an additional 200 μL of catalyst was added, and the reaction was continued for an additional 4 hours. At the end of the reaction the contents of the reactor were poured hot into a Pyrex tray and dried in a solvent oven at 80° C. for 24-48 h, until the smell of toluene ceased. The materials and amounts used in forming the alkyl dimethicones of Examples 1-11 are shown in Table 3.

TABLE 3

Materials and amounts used in synthesis of alkyl dimethicones.

| Example No. | Silicone hydride source (g) | C30+ HA (g) |
|---|---|---|
| 1 | HMS-082 | 1300 | 960 |
| 2 | A | 1290 | 321 |
| 3 | B | 1290 | 245 |
| 4 | C | 1215 | 174 |
| 5 | D | 1274 | 702 |
| 6 | E | 1276 | 503 |
| 7 | F | 1303 | 503 |
| 8 | G | 1240 | 289 |
| 9 | H | 1800 | 770 |
| 10 | I | 1877 | 737 |
| 11 | J | 1712 | 684 |

Examples 12-14

A glass reactor was charged with the silicone hydride reaction product indicated in Table 4, an amount of C30+HA as

TABLE 2

Materials and amounts used in synthesis of silicone hydride materials.

| Silicone Hydride | Hydride Source (g) | D4 (g) | Endblocker (g) | Viscosity (cP) | Mole % $\left[\begin{array}{c} H \\ | \\ Si-O \\ | \\ CH_3 \end{array}\right]$ |
|---|---|---|---|---|---|
| A | HMS-082 | 548.10 | 1051.90 | None | — | 1183 | 2.6 |
| B | HMS-082 | 424.80 | 1175.20 | None | — | 2323 | 2.0 |
| C | HMS-151 | 135.87 | 1464.17 | None | — | 3430 | 1.5 |
| D | D'4 | 77.01 | 1514.67 | HMDS | 9.24 | 3053 | 5.7 |
| E | D'4 | 55.74 | 1529.88 | HMDS | 14.51 | 990 | 4.1 |
| F | D'4 | 55.88 | 1533.67 | HMDS | 11.10 | 2293 | 4.0 |
| G | D'4 | 33.70 | 1556.93 | HMDS | 10.15 | 2865 | 2.4 |
| H | D'4 | 121.92 | 3346.34 | HMDS | 31.74 | 720 | 4.5 |
| I | PMHS | 118.83 | 3367.23 | HMDS | 13.94 | 2820 | 4.1 |
| J | D'4 | 109.59 | 3007.83 | HMDS | 21.77 | 1933 | 4.2 |
| K | PMHS | 2207 | 62534 | HMDS | 259 | 3540 | 3.9 |

Hydrosilylation.

In the case of Example 1, 1300 g HMS-082 was used directly in the hydrosilylation without further modification. The viscosity of HMS-082 was determined to be 161 cP, with 7.8 mole % of silicone hydride functionality measured. The silicone hydride source indicated, and C30+ HA were placed in a 5 L glass reactor in the amounts indicated in Table 3, along with 500 mL toluene (1000 mL in the case of Example 1), under an Argon sweep, and the contents of the reactor were brought to 70° C. Then 300 μL of Karstedt's Catalyst was added via syringe, and the reaction was allowed to proceed for indicated in Table 4, and 245 mL of toluene under an Argon sweep, and the contents were brought to 70° C. Then 300 μL of Karstedt's Catalyst was added via syringe, and the reaction was allowed to proceed for 19 h at which time the contents were sampled and analyzed by ¹H NMR (300 MHz, d₈-THF) to confirm complete consumption of the C30+ HA. Then an amount of 1-octene (obtained from Alfa Aesar of Ward Hill, Mass.) indicated in Table 4 and 150 μL Karstedt's catalyst were added to the reactor, and the reaction temperature was raised to 90° C. After about 4.5 hr, ¹H NMR revealed that less than 1% of the initial hydride functionality attributable to the silicone hydride source remained. The contents of the reactor were poured hot into a Pyrex tray and dried in a solvent oven at 80° C. for 24-48 h, until the smell of toluene ceased.

TABLE 4

Reagents and amounts added for syntheses of alkyl dimethicones 12-14.

| Example No. | Silicone hydride source (g) | C30+ HA (g) | Octene (g) |
|---|---|---|---|
| 12 | H | 862 | 369 | 73 |
| 13 | I | 639 | 249 | 59.4 |
| 14 | K | 22732 | 8459 | 621 |

Examples 15-37

NA217000 pellets were fed to a 25 mm twin screw extruder having an intensive mixing screw design and all zones held at 190° C. An alkyl dimethicone indicated in Table 3 was fed into the extruder in the indicated weight percent, either as a liquid at 100° C.-120° C. by means of a heated gear pump and transfer line, or as a bag blended mixture with the NA217000 pellets. The melt was extruded through a die at a total throughput of 4.53 kg/h to afford films of 0.025 cm thickness. The composition and amount of alkyl dimethicone in the films is shown in Table 5. Control example C1 was NA217000 extruded alone.

TABLE 5

Composition of single release layer films of Examples 15-37.

| Example | Alkyl dimethicone, Ex. No. | Wt % Alkyl dimethicone |
|---|---|---|
| C1 | none | 0 |
| 15 | 1 | 1.70 |
| 16 | 1 | 4.30 |
| 17 | 2 | 0.86 |
| 18 | 2 | 1.70 |
| 19 | 2 | 4.30 |
| 20 | 3 | 0.86 |
| 21 | 3 | 1.70 |
| 22 | 3 | 4.30 |
| 23 | 4 | 0.86 |
| 24 | 4 | 1.70 |
| 25 | 4 | 4.30 |
| 26 | 5 | 0.86 |
| 27 | 5 | 1.70 |
| 28 | 5 | 4.30 |
| 29 | 6 | 0.86 |
| 30 | 6 | 1.70 |
| 31 | 6 | 4.30 |
| 32 | 7 | 0.86 |
| 33 | 7 | 1.70 |
| 34 | 7 | 4.30 |
| 35 | 8 | 0.86 |
| 36 | 8 | 1.70 |
| 37 | 8 | 4.30 |

The release layers were tested on one major side thereof (the release surface).

A 2.54 cm (one inch) wide by 20.3 cm (eight inch) long strip of Tape A was rolled down onto a release surface to be tested using two complete passes of a 2 kg rubber roller having a width of 44 mm. Then the Tape A/release layer composite test samples were cut away from the rest of the release layer and allowed to age for 7 days at 23° C./50% RH. The test tape/release film composite samples were then attached to the platen a of 3M90 slip/peel tester (obtained from Instrumentors, Inc. of Strongsville, Ohio) using 410M double sided tape (obtained from the 3M Corporation of Maplewood, Minn.), with the test tape facing up. The average release force required to peel the test tape from the release film was measured at a 180° peel angle, at a peel rate of 228.6 cm/min (90 in/min), using a 5 second peel. All measurements were done in duplicate. Results of the peel testing are shown in Table 6.

After Tape A was peeled from the release layer, it was immediately laminated to a glass plate attached to the platen in the slip/peel tester, using two complete passes of the 2 kg rubber roller as described above. The glass plate was wiped prior to use with heptane, isopropyl alcohol, and methyl ethyl ketone. The average peel force (readhesion) from glass was measured at a 180° peel angle, with a peel rate of 228.6 cm/min (5 second peel). The glass plate was cleaned between each readhesion test by wiping with heptane, isopropyl alcohol, and methyl ethyl ketone. Readhesion was calculated as a percent of the adhesion of the same tape directly taken from the roll and adhered to the glass. Results of the readhesion are shown in Table 6.

Adhesion and readhesion were tested using the same materials and procedures, except that the release force and readhesion were measured after aging for 7 days at 50° C. followed by one day at 23° C./50% RH. The results of the release and readhesion testing are shown in Table 6.

TABLE 6

Release and readhesion data for Tape A laminated to release layers of Table 5.

| | 7 days at 23° C./50% RH | | 7 days at 50° C. followed by one day at 23° C./50% RH | |
|---|---|---|---|---|
| Example | Release force, g/cm | Readhesion | Release force, g/cm | Readhesion |
| C1 | 157 | 89% | 157 | 86% |
| 15 | 34.7 | 94% | 37.9 | 86% |
| 16 | 15.6 | 91% | 23.9 | 99% |
| 17 | 35.8 | 93% | 53.5 | 91% |
| 18 | 8.2 | 67% | 12.6 | 68% |
| 19 | 1.6 | 48% | 3.1 | 53% |
| 20 | 22.4 | 84% | 37.9 | 78% |
| 21 | 9.5 | 65% | 15.0 | 63% |
| 22 | 2.4 | 47% | 3.4 | 48% |
| 23 | 36.1 | 74% | 48.6 | 76% |
| 24 | 10.7 | 55% | 19.3 | 82% |
| 25 | 4.0 | 86% | 5.0 | 52% |
| 26 | 61.0 | 86% | 76.0 | 105% |
| 27 | 25.6 | 93% | 30.3 | 100% |
| 28 | 6.3 | 71% | 7.7 | 67% |
| 29 | 41.7 | 91% | 59.8 | 103% |
| 30 | 16.2 | 90% | 19.9 | 93% |
| 31 | 3.3 | 82% | 3.8 | 65% |
| 32 | 40.2 | 99% | 52.7 | 108% |
| 33 | 15.1 | 84% | 17.7 | 82% |
| 34 | 3.9 | 54% | 4.4 | 52% |
| 35 | 32.1 | 71% | 45.3 | 90% |
| 36 | 8.9 | 66% | 14.7 | 68% |
| 37 | 3.2 | 51% | 3.5 | 58% |

The adhesion and readhesion tests as described above and shown in Table 6 were repeated with Tape B. The results are shown in Table 7.

TABLE 7

Release and readhesion data for Tape B laminated to release layers of Table 5.

| | 7 days at 23° C./50% RH | | 7 days at 50° C. followed by one day at 23° C./50% RH | |
|---|---|---|---|---|
| Example | Release force, g/cm | Readhesion | Release force, g/cm | Readhesion |
| C1 | 94.9 | 98% | 106 | 86% |
| 15 | 17.6 | 99% | 17.8 | 94% |
| 16 | 10.8 | 94% | 10.7 | 87% |
| 17 | 19.1 | 106% | 24.1 | 96% |
| 18 | 6.4 | 85% | 7.6 | 92% |
| 19 | 3.2 | 75% | 3.5 | 74% |
| 20 | 11.7 | 106% | 16.8 | 96% |
| 21 | 7.0 | 99% | 9.1 | 97% |
| 22 | 2.4 | 82% | 3.7 | 76% |
| 23 | 19.6 | 104% | 25.7 | 93% |
| 24 | 7.3 | 95% | 10.7 | 90% |
| 25 | 3.6 | 77% | 4.1 | 75% |
| 26 | 28.4 | 93% | 33.8 | 92% |
| 27 | 13.1 | 97% | 13.8 | 93% |
| 28 | 5.0 | 90% | 5.2 | 86% |
| 29 | 20.8 | 97% | 26.1 | 94% |
| 30 | 9.6 | 94% | 10.0 | 93% |
| 31 | 3.8 | 82% | 4.0 | 77% |
| 32 | 20.5 | 96% | 25.4 | 96% |
| 33 | 9.6 | 101% | 10.0 | 97% |
| 34 | 3.9 | 82% | 4.0 | 80% |
| 35 | 16.9 | 95% | 23.5 | 92% |
| 36 | 6.9 | 101% | 8.5 | 94% |
| 37 | 3.3 | 73% | 3.3 | 70% |

The adhesion and readhesion tests as described above and shown in Tables 6 and 7 were repeated with Tape C, except that in order to prevent stretching of the PVC backing of Tape C, a one inch wide strip of Tape B was laminated to the Tape C backing prior to rolling down onto the selected release layer, and all subsequent testing was carried out using this composite test tape. The results are shown in Table 8.

TABLE 8

Release and readhesion data for Tape C (composite with Tape B) laminated to release layers of Table 5.

| | 7 days at 23° C./50% RH | | 7 days at 50° C. followed by one day at 23° C./50% RH | |
|---|---|---|---|---|
| Example | Release force, g/cm | Readhesion | Release force, g/cm | Readhesion |
| C1 | 48.0 | 96% | 53.5 | 100% |
| 15 | 23.9 | 101% | 26.4 | 97% |
| 16 | 17.8 | 92% | 18.5 | 91% |
| 17 | 26.9 | 106% | 32.4 | 100% |
| 18 | 15.5 | 94% | 16.5 | 92% |
| 19 | 7.8 | 82% | 9.2 | 81% |
| 20 | 24.1 | 102% | 32.7 | 94% |
| 21 | 16.5 | 95% | 18.1 | 100% |
| 22 | 8.9 | 82% | 9.6 | 85% |
| 23 | 31.4 | 103% | 39.1 | 100% |
| 24 | 17.5 | 95% | 22.2 | 87% |
| 25 | 10.6 | 78% | 10.9 | 79% |
| 26 | 31.0 | 103% | 39.3 | 104% |
| 27 | 23.0 | 100% | 24.9 | 100% |
| 28 | 13.5 | 86% | 13.6 | 81% |
| 29 | 29.8 | 105% | 33.6 | 104% |
| 30 | 19.1 | 97% | 20.0 | 103% |
| 31 | 11.5 | 83% | 11.3 | 82% |
| 32 | 28.1 | 106% | 34.5 | 106% |
| 33 | 18.6 | 95% | 18.6 | 101% |
| 34 | 11.3 | 83% | 11.4 | 81% |
| 35 | 29.3 | 101% | 35.5 | 95% |
| 36 | 14.5 | 94% | 17.6 | 98% |
| 37 | 9.9 | 77% | 9.8 | 73% |

Examples 38-41

Masterbatch pellets having 87 parts by weight of NA217000 and 13 parts by weight of the alkyl dimethicone of Example 7 were formed using the technique described for Examples 15-37, except that instead of forming films the melt stream was fed through a circular die into a chilled water bath and strand pelletized at a throughput of 4.53 to 22.7 kg/h to form pellets. The pellets were then used to make release layers in three layer blown film constructions having the compositions shown in Table 9, where Layer 2 is disposed between Layer 1 and Layer 3 in each construction. All layers were 0.0025 cm thick, such that all three-layer constructions all had a total thickness of 0.0075 cm. A control three layer construction, C2, employed NA217000 in Layer 1 with no alkyl dimethicone containing pellets.

TABLE 9

Composition of three-layer blown films.

| Example | Material | Layer 1, g | Layer 2, g | Layer 3, g |
|---|---|---|---|---|
| C2 | NA217000 | 975 | 1017 | 975 |
| | 13:87 Ex. 7:NA217000 pellets | 0 | 0 | 0 |
| | Ampecet UV PE MB 10407 | 42 | 42 | 42 |
| | PolyOne Silver Black #1 | 42 | 0 | 0 |
| | PolyOne 3800 Black PEC | 0 | 0 | 42 |
| 38 | NA217000 | 934 | 1017 | 975 |
| | 13:87 Ex. 7:NA217000 pellets | 41 | 0 | 0 |
| | Ampecet UV PE MB 10407 | 42 | 42 | 42 |
| | PolyOne Silver Black #1 | 42 | 0 | 0 |
| | PolyOne 3800 Black PEC | 0 | 0 | 42 |
| 39 | NA217000 | 913 | 1017 | 975 |
| | 13:87 Ex. 7:NA217000 pellets | 61 | 0 | 0 |
| | Ampecet UV PE MB 10407 | 42 | 42 | 42 |
| | PolyOne Silver Black #1 | 42 | 0 | 0 |
| | PolyOne 3800 Black PEC | 0 | 0 | 42 |
| 40 | NA217000 | 893 | 1017 | 975 |
| | 13:87 Ex. 7:NA217000 pellets | 81 | 0 | 0 |
| | Ampecet UV PE MB 10407 | 42 | 42 | 42 |
| | PolyOne Silver Black #1 | 42 | 0 | 0 |
| | PolyOne 3800 Black PEC | 0 | 0 | 42 |
| 41 | NA217000 | 852 | 1017 | 975 |
| | 13:87 Ex. 7:NA217000 pellets | 122 | 0 | 0 |
| | Ampecet UV PE MB 10407 | 42 | 42 | 42 |
| | PolyOne Silver Black #1 | 42 | 0 | 0 |
| | PolyOne 3800 Black PEC | 0 | 0 | 42 |

Each of the three layer films was tested for release according to the general procedure set forth for Examples 15-37, except that Tape E was laminated to Layer 1 and aging was carried out using one of a set of three conditions, Conditions A-C, prior to peel testing. Condition A is subjecting the composite sample to 22° C./50% relative humidity for 1 week, Condition B is subjecting the composite sample to 49° C. for one week, and Condition C is aging Layer 1 for 1 week at 49° C. prior to lamination of Tape E to Layer 1, followed by release force testing without further aging. Release force was measured at peel rates of 30.5 cm/min and 229 cm/min. Results are shown in Table 10.

TABLE 10

Release data for Tape E after aging.

| | Amt. | Peel | Release after aging, g/cm | | |
|---|---|---|---|---|---|
| Example | Ex. 7, wt % | Rate, cm/min | Aging Condition A | Aging Condition B | Aging Condition C |
| C2 | 0.00 | 30.5 | 1483 | 1471 | 1636 |
| 38 | 0.50 | 30.5 | 1135 | 1265 | 1337 |

TABLE 10-continued

Release data for Tape E after aging.

| Example | Amt. Ex. 7, wt % | Peel Rate, cm/min | Release after aging, g/cm | | |
|---|---|---|---|---|---|
| | | | Aging Condition A | Aging Condition B | Aging Condition C |
| 39 | 0.75 | 30.5 | 979 | 1055 | 1182 |
| 40 | 1.00 | 30.5 | 921 | 1056 | 1050 |
| 41 | 1.50 | 30.5 | 870 | 985 | 932 |
| C2 | 0.00 | 228.6 | 2139 | 2018 | 2274 |
| 38 | 0.50 | 228.6 | 1746 | 1926 | 1734 |
| 39 | 0.75 | 228.6 | 1579 | 1675 | 1771 |
| 40 | 1.00 | 228.6 | 1450 | 1602 | 1508 |
| 41 | 1.50 | 228.6 | 1267 | 1574 | 1389 |

Examples 42-44

Masterbatch pellets were formed by employing the techniques described for Examples 38-41, except that 15 parts by weight of the alkyl dimethicone of Example 14 was added to the formulation instead of 13 parts by weight, and 85 parts by weight of NA217000 was added to the formulation instead of 87 parts by weight. Three layer films were then formed using the masterbatch pellets, and the films were used to form tape rolls. Three lots of 3.0 mil thick 3-layer blown film were made using a continuous blown film extrusion apparatus, employing the materials as indicated in Table 11 for each layer, wherein the final amounts of alkyl dimethicone in Layer 1 were adjusted to be 0.75%, 1.0% and 1.5% by weight. The films were corona treated, then a scrim was placed against Layer 3, and a standard natural rubber duct tape adhesive formulation was hot melt coated onto the scrim and Layer 3 of each film backing at a coating weight of 12.5 mg/cm² (30 grains/24 in²). Three lots of adhesive coated tape were made using the experimental alkyl dimethicone release layers, and one control example, C3, was made by coating adhesive onto a control duct tape film backing having 4% ethylene bis-stearamide release additive. Materials and treatment details are shown in Table 11.

TABLE 11

Composition of three-layer blown films.

| Example | Material | Layer 1, g | Layer 2, g | Layer 3, g |
|---|---|---|---|---|
| 42 | Petrothene ® NA217000 | 913 | 1017 | 975 |
| | 15:85 Ex. 14:NA217000 pellets | 61 | 0 | 0 |
| | Ampecet UV PE MB 10407 | 42 | 42 | 42 |
| | PolyOne Silver Black #1 | 42 | 0 | 0 |
| | PolyOne 3800 Black PEC | 0 | 0 | 42 |
| 43 | Petrothene ® NA217000 | 893 | 1017 | 975 |
| | 15:85 Ex. 14:NA217000 pellets | 81 | 0 | 0 |
| | Ampecet UV PE MB 10407 | 42 | 42 | 42 |
| | PolyOne Silver Black #1 | 42 | 0 | 0 |
| | PolyOne 3800 Black PEC | 0 | 0 | 42 |
| 44 | Petrothene ® NA217000 | 852 | 1017 | 975 |
| | 15:85 Ex. 14:NA217000 pellets | 122 | 0 | 0 |
| | Ampecet UV PE MB 10407 | 42 | 42 | 42 |
| | PolyOne Silver Black #1 | 42 | 0 | 0 |
| | PolyOne 3800 Black PEC | 0 | 0 | 42 |

Unwind force measurements of the tape rolls formed were recorded following Pressure Sensitive Tape Council Test Standard PSTC-8 where the average peak unwind force is recorded (average of 20 highest unwind force data points). Unwind force measurements for tape rolls C3 and Examples 42-44 are shown in Table 12.

TABLE 12

Release data for Tape E at 30.5 cm/min peel rates after aging tape rolls.

| Example | Peel Rate, cm/min | Unwind, g/cm Age Condition A | Unwind, g/cm Age Condition B |
|---|---|---|---|
| C3 | 30.5 | 904 | 670 |
| 42 | 30.5 | 960 | 580 |
| 43 | 30.5 | 659 | 681 |
| 44 | 30.5 | 770 | 580 |

Examples 45-70

The alkyl dimethicones indicated in Table 13 were compounded into NA217000 LDPE at the indicated loading using a 25 mm twin screw extruder held at 190° C. The alkyl dimethicone was delivered to the extruder as a liquid at 120° C. by means of a heated gear pump and transfer line. The melt was extruded through a stranding die into a chilled water bath and pelletized at a rate of 13.6 Kg/hour.

TABLE 13

Components of masterbatched pellets.

| Example | Alkyl Dimethicone, Ex. No. | Alkyl Dimethicone, wt % | LDPE |
|---|---|---|---|
| 45 | 9 | 0.5 | NA219000 |
| 46 | 9 | 2.2 | NA219000 |
| 47 | 9 | 5.0 | NA217000 |
| 48 | 10 | 3.5 | NA217000 |
| 49 | 12 | 0.8 | NA219000 |
| 50 | 12 | 1.2 | NA219000 |
| 51 | 12 | 5.0 | NA219000 |
| 52 | 13 | 1.1 | NA219000 |
| 53 | 13 | 1.5 | NA219000 |
| 54 | 13 | 5.0 | NA219000 |
| 55 | 11 | 1.0 | NA219000 |
| 56 | 11 | 5.0 | NA219000 |

Two layer coextruded films were produced having a first layer of NA217000 LDPE and a second layer including one of the masterbatches of Table 13. A 27 mm twin screw extruder was used to deliver NA217000 at 4.5 kg/hr to a two layer feedblock on a 20 cm wide single layer film die. The temperatures in the zones of the extruder were ramped up from 150° C. in the first zone to 302° C. in the final zone, with a screw rotation speed of 75 RPM, resulting in a melt temperature of 304° C. A 25 mm twin screw extruder was used to deliver masterbatch pellets of Table 13, optionally mixed with additional LDPE pellets to reach a targeted alkyl dimethicone concentration, at 4.5 kg/hr to the two layer feedblock. Temperatures in the 25 mm extruder were ramped up from 226° C. in the first zone to 260° C. in the final zone, with a screw rotation speed of 150 RPM, resulting in a melt temperature of 274° C. The feedblock and die were held at 302° C. The two layer extrudate was extruded and quenched against a smooth metal cast wheel set at 27° C., with the LDPE-only layer against the cast wheel. The cast wheel rotation speed was adjusted to obtain an overall film thickness of either 254 lam or 102 μm (10 mil or 4 mil). The compositions of the release layer portion of the two layer films are shown in Table 14.

TABLE 14

Components of release layers for 2-layer films.

| Example | Pellet Feed, wt % | Release Layer Composition, wt % of Dimethicone in LDPE |
|---|---|---|
| 57 | Ex. 46, 100 | 2.2 wt % Ex. 9 in NA219000 |
| 58 | Ex. 48, 100 | 3.5 wt % Ex. 10 in NA217000 |
| 59 | Ex. 50, 100 | 1.2 wt % Ex. 12 in NA219000 |
| 60 | Ex. 53, 100 | 1.5 wt % Ex. 13 in NA219000 |
| 61 | Ex. 45, 100 | 0.5 wt % Ex. 9 in NA219000 |
| 62 | Ex. 47, 40; NA217000, 60 | 2.0 wt % Ex. 9 in NA217000 |
| 63 | Ex. 55, 100 | 1.0 wt % Ex. 11 in NA219000 |
| 64 | Ex. 56, 40; NA219000, 60 | 2.0 wt % Ex. 11 in NA219000 |
| 65 | Ex. 49, 100 | 0.8 wt % Ex. 12 in NA219000 |
| 66 | Ex. 51, 40; NA219000, 60 | 2.0 wt % Ex. 12 in NA219000 |
| 67 | Ex. 51, 60; NA219000, 40 | 3.0 wt % Ex. 12 in NA219000 |
| 68 | Ex. 52, 100 | 1.1 wt % Ex. 13 in NA219000 |
| 69 | Ex. 54, 40; NA219000, 60 | 2.0 wt % Ex. 13 in NA219000 |
| 70 | Ex. 54, 60; NA219000, 40 | 3.0 wt % Ex. 13 in NA219000 |

A knife coater with a gap set to target a dried coating thickness of 25.4 μm (1 mil) was used to coat Adhesive D onto the release films of Examples 57-60. The wet coatings were dried by placing the coated layer or liner in a convection oven at 70° C. for ten minutes. The dried coatings were then stored for one day at 23° C./50% RH followed by lamination of a 2 mil HOSTAPHAN® 3SAB primed PET film (obtained from Mitsubishi Polyester Film Inc. of Greer, S.C.) to the adhesive surface to give a composite sample. Then 2.54 cm by 20.3 cm test strips were cut from the composite sample and the test strips were aged for one week at 23° C./50% RH, or for one week at 50° C. followed by one day at 23° C./50% RH prior to testing. The release force and adhesion testing was carried out according to the procedures above for Examples 15-37, except that adhesion is not reported as a percent of control adhesion. The results were compared to those obtained with the Control Liner. The results are shown in Table 15.

TABLE 15

Release and adhesion data for solvent coated Adhesive D on two layer coextruded release films, compared to Control Liner.

| | 7 days at 23° C./50% RH | | 7 days at 50° C., then 1 day at 23° C./50% RH | |
|---|---|---|---|---|
| Release Film, Ex. No. | Release Force (g/cm) | Adhesion (N/dm) | Release Force (g/cm) | Adhesion (N/dm) |
| Control Liner | 2.6 | 65 | 4.6 | 63 |
| 57 | 5.7 | 57 | 5.8 | 42 |
| 58 | 5.4 | 50 | 6.0 | 42 |
| 59 | 5.5 | 69 | 5.4 | 62 |
| 60 | 5.1 | 68 | 5.5 | 60 |

The two-layer release films of Examples 61-70 were tested for release and readhesion with test tapes Tape A and Tape C in the same manner as described for Examples 15-37 above, wherein aging was for one week at 23° C./50% RH or for one week at 50° C. followed by one day reconditioning at 23° C./50% RH. The results are shown in Table 16.

TABLE 16

Release and readhesion data for tapes A and C laminated to release films of Examples 61-70.

| | | 7 days at 23° C./50% RH | | 7 days at 50° C. followed by one day at 23° C./50% RH | |
|---|---|---|---|---|---|
| Example | Test Tape | Release Force (g/cm) | Readhesion, % | Release Force (g/cm) | Readhesion, % |
| 61 | A | 42 | 82 | 60 | 77 |
|    | C | 33 | 87 | 38 | 85 |
| 62 | A | 10 | 64 | 10 | 61 |
|    | C | 17 | 74 | 15 | 81 |
| 63 | A | 17 | 78 | 18 | 65 |
|    | C | 20 | 82 | 22 | 85 |
| 64 | A | 11 | 61 | 11 | 55 |
|    | C | 19 | 74 | 17 | 72 |
| 65 | A | 17 | 97 | 24 | 87 |
|    | C | 21 | 87 | 22 | 84 |
| 59 | A | 11 | 86 | 13 | 80 |
|    | C | 17 | 81 | 18 | 80 |
| 66 | A | 9 | 65 | 9 | 57 |
|    | C | 16 | 74 | 14 | 76 |
| 67 | A | 8 | 55 | 8 | 53 |
|    | C | 14 | 76 | 12 | 82 |
| 68 | A | 15 | 85 | 16 | 72 |
|    | C | 21 | 92 | 19 | 95 |
| 60 | A | 11 | 77 | 11 | 66 |
|    | C | 19 | 90 | 17 | 90 |
| 69 | A | 10 | 75 | 10 | 70 |
|    | C | 16 | 96 | 17 | 92 |
| 70 | A | 7 | 58 | 8 | 55 |
|    | C | 15 | 80 | 14 | 80 |

Example 71

The alkyl dimethicone of Example 14 was compounded into NA217000 LDPE at a loading of 15 weight percent using a 25 mm twin screw extruder held at 190° C. The alkyl dimethicone was delivered to the extruder as a liquid at 120° C. by means of a heated gear pump and transfer line. The melt was extruded through a stranding die into a chilled water bath and pelletized at a rate of 13.6 Kg/hour.

A 62 pound bleached kraft paper was extrusion coated on one side with a blend of low density and high density polyethylene resin at a thickness of 25 μm and slit to 68.6 cm wide. The coated paper was then coextrusion coated on the exposed paper side using the following process. The uncoated side of the paper was exposed to a flame treatment process. The flame treated paper surface was then coextrusion coated with a two layer melt having NA217000 LDPE polyethylene in one layer and a blend of NA217000 LDPE polyethylene with the alkyl dimethicone masterbatch in the other layer via an extrusion die equipped with a two layer feedblock, such that the LDPE-only layer was contacted with the flame-treated paper surface.

Layer 1 of the two layer construction was NA217000 LDPE, fed to the die via the feedblock at a temperature of 316° C. at a rate of 64 Kg/hour using a single screw extruder. Layer 2 of the two layer construction was formed by admixing NA217000 LDPE pellets with the 15 wt % alkyl dimethicone masterbatch pellets at a ratio of 1.54 masterbatch pellets to 10 LDPE pellets, and feeding the pellet blend via a single feed hopper. The blend resulted in 2 wt % of the alkyl dimethicone release additive in Layer 2. This ratio was fed to the die via the feedblock at a temperature of approximately 287° C. at a rate of 64 Kg/hr using a single screw extruder.

The composite extrudate exited the drop die opening and traveled approximately 20 cm to a nip where the composite, coextruded molten polyethylene layer was contacted with the flame treated paper and solidified through a two roll nip. Layer 1 contacted the paper fibers and formed a bond to the flame treated paper. Layer 2 contacted a smooth chilled chrome roll used to accelerate the solidification of the layers. The line speed was 122 meter/min, resulting in a coextruded two-layer thickness of 25 microns. The resultant solidified composite structure was then inline slit to a width of 63.5 cm and wound into roll form for further processing.

The release force and % readhesion of Tape C was tested, as described above for Examples 15-37. After aging the composite of Tape C laminated to Layer 2 of the two-layer construction for seven days at 23° C./50% RH, the release force was 16 g/cm, with 90% readhesion. After aging the composite of Tape C laminated to Layer 2 of the two-layer construction for seven days at 50° C., followed by one day at 23° C./50% RH, the release force was 13 g/cm, with 97% readhesion.

Example 72

Samples of the construction of Example 71 described above were processed via an embossing and coating operation similar to that described in Examples 9 to 33 of U.S. Pat. No. 6,197,397. Layer 2 of Ex. 71 was micro-embossed with small pits and the pits were filled with fine glass beads according to the procedure described in U.S. Pat. No. 5,362,516. The bead-coated construction was then further embossed on the Layer 2 side by passing the release liner between an 85 durometer silicone rubber roll and an engraved metal roll. The engraved pattern was similar to that employed in Examples 4 to 10 in U.S. Pat. No. 6,872,268 except with a larger land area.

Adhesive D was coated onto the Layer 2 side of the Ex. 71 construction and heated in an oven to remove the solvent. The thickness of the dried adhesive layer was about 30 microns. A 51 micron thick PVC film was then laminated to the adhesive to form a composite construction.

The composite construction was then tested for release properties as follows. The force needed to remove the liner from the adhesive/PVC layer was measured using an IMASS ZPE-1100W peel tester (obtained from IMASS, Inc. of Accord, Mass.) with a peel angle of 180° and a peel rate of 762 cm/min. The testing was done about 2 months after the composite construction was produced. A first test was done on the composite construction as stored in the laboratory for the two month period, where the peel force was measured as 14 g/cm. A sample of the composite construction was then aged at 50° C. for an additional 7 days, followed by one day at 23° C./50% RH and peel tested as described. The peel force measured was 17 g/cm.

Examples 73-75

Extrusion coating of paper was carried out using a single screw extruder equipped with a 15 cm wide die and a nip station. A roll of 62.5 lb kraft paper was corona treated using a 20 cm Enercon bare roll corona treater (obtained from Enercon Industries Corporation of Menomonie Falls, Wis.), with a power setting of 0.35 kilowatts, and wound up on itself. Resin pellets were fed into a 1.9 cm single screw extruder obtained from C.W. Brabender Instruments Inc. of South Hackensack, N.J., with an exit melt temperature of 213° C. A variety of polyethylene copolymer/LDPE blends, shown in Table 17, were extrusion coated onto the kraft paper via extrusion coating of a 0.05 mm thick film onto corona treated paper and run between a steel chill roll and a rubber backup roll at a speed of 3 meters/min. Primacor 3440, Amplify GR 202, and Amplify GR 209 were obtained from the Dow Chemical Company of Midland, Mich.

The adhesion of the polymer layer to the paper was assessed a day later by tearing the paper and trying to peel off the polymer coating. A rating of "good" is assessed where the polymer layer either cannot be peeled off, or pulls off a significant amount of paper fibers where it is removed (cohesive failure). A poor result is a polymer layer that is easily peeled from the paper by hand (adhesive failure). Table 17 shows the ratings assessed for various blends of functional olefins with LDPE extrusion coated onto paper.

TABLE 17

Adhesion of polyethylene copolymer/LDPE blends extrusion coated onto paper at 213° C.

| Example | Composition (wt ratios) | Bond to Paper |
|---|---|---|
| C4 | NA217000 LDPE | Poor |
| 73 | 25/75 Amplify GR 202/NA217000 LDPE | Good |
| 74 | 25/75 Amplify GR209/NA217000 LDPE | Good |
| 75 | 50/50 Primacor 3440/NA217000 LDPE | Good |

Example 76

A coextrusion coated paper release liner including a first coating layer that is a blend of LDPE and a functional polyolefin, and a second layer that is a blend of LDPE and an alkyl dimethicone of the invention, is coextrusion coated at temperatures of less than 250° C., such as between 200° C. and 250° C., with the result of good interfacial adhesion.

The alkyl dimethicone of Example 14 is compounded into a pelletized masterbatch having NA217000 LDPE at a loading of 15 weight alkyl dimethicone according to the procedure of Example 71.

A 62 pound bleached kraft paper is extrusion coated on one side with a blend of low density and high density polyethylene resin at a thickness of 25 µm and slit to 68.6 cm wide. The coated paper is then coextrusion coated on the exposed paper side using the following process. The uncoated side of the paper is exposed to a corona treatment as conducted for Examples 73-75. The corona treated paper surface is then coextrusion coated with a two layer melt having 25/75 wt/wt Amplify GR 202/NA217000 LDPE in one layer and a blend of NA217000 LDPE polyethylene and alkyl dimethicone masterbatch in the other layer via an extrusion die equipped with a two layer feedblock, such that the Amplify GR 202/NA217000 LDPE layer is contacted with the corona treated paper surface.

Layer 1 of the two layer construction is formed by admixing Amplify GR 202 and NA217000 LDPE pellets and feeding the mixture to a single screw extruder using the process of Examples 73-75. Layer 2 of the two layer construction is formed by admixing NA217000 LDPE pellets with the 15 wt % alkyl dimethicone masterbatch pellets at a ratio of 1.54 masterbatch pellets to 10 LDPE pellets, and feeding the pellet blend via a single feed hopper of a single screw extruder.

The composite extrudate exits the drop die opening and travels to a nip where the composite, coextruded molten polyethylene layer is contacted with the corona treated paper at a temperature of 215° C., then the composite construction is solidified through a two roll nip. Layer 1 contacts the paper fibers and forms a bond to the corona treated paper. Layer 2 contacts a smooth chilled chrome roll used to accelerate the solidification of the layers. The coextruded two-layer thickness is 25 microns.

The adhesion of the coextruded layers to each other and to the paper is assessed a day later by tearing the paper and trying to peel off the polymer coating. Using the rating system of Examples 73-75, the adhesion between the paper and the coextruded layers is good, and no interlayer adhesion failure is observed between Layer 1 and Layer 2.

The present invention may suitably comprise, consist of, or consist essentially of, any of the disclosed or recited elements. As used herein, the term "consisting essentially of" does not exclude the presence of additional equipment or materials which do not significantly affect the desired characteristics, properties, or use of a given composition, product, method, or apparatus.

The invention illustratively disclosed herein can be suitably practiced in the absence of any element which is not specifically disclosed herein. The various embodiments described above are provided by way of illustration only and should not be construed to limit the claims attached hereto. It will be recognized that various modifications and changes may be made without following the example embodiments and applications illustrated and described herein, and without departing from the true spirit and scope of the following claims.

We claim:

1. A tape construction comprising a tape backing, a pressure sensitive adhesive disposed on the tape backing, and a release layer contacted with the adhesive, the release layer comprising a polyolefin and about 0.5 wt % to 10 wt % of an alkyl dimethicone, the alkyl dimethicone having a structure comprising

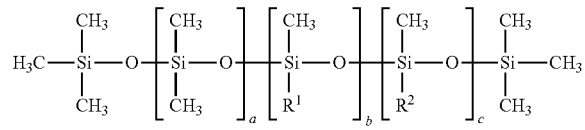

wherein the sum of (a+b+c) is between about 100 and 1000, the ratio of a to the sum of (b+c) is about 98:2 to 94:6, $R^1$ is a linear, branched, or cyclic alkyl group having between 20 and 50 carbon atoms, and $R^2$ is a linear, branched, or cyclic alkyl or alkaryl group having between 6 and 10 carbons.

2. The tape construction of claim 1 wherein the release layer comprises about 1 wt % to 4 wt % of the alkyl dimethicone.

3. The tape construction of claim 1 wherein the alkyl dimethicone is a blend of two or more species thereof, wherein the species differ in terms of the sum of (a+b+c), the ratio of a to the sum of (b+c), the structure of the repeat units b or c, or in two or more such parameters.

4. The tape construction of claim 1 wherein the sum of (a+b+c) is about 200 to 500.

5. The tape construction of claim 1 wherein $R^1$ is a linear alkyl chain having between 22 and 46 carbon atoms.

6. The tape construction of claim 1 wherein $R^2$ is a linear alkyl chain having 8 carbon atoms.

7. The tape construction of claim 1 wherein the sum of (a+b+c) is about 300 to 400.

8. The tape construction of claim 1 wherein c is 0.

9. The tape construction of claim 1 wherein the polyolefin is polyethylene or a copolymer thereof.

10. The tape construction of claim 1 wherein the alkyl dimethicone is characterized by the substantial absence of olefinic impurities.

11. The tape construction of claim 1 wherein the release layer is disposed on a substrate.

12. The tape construction of claim 1 further comprising a layer contiguous to the release layer, the contiguous layer comprising the polyolefin present in the release layer.

13. The tape construction of claim 1 where the tape construction is wound upon itself.

14. The tape construction of claim 1 further comprising a substrate, wherein the release layer does not contact the substrate.

15. The tape construction of 14 wherein the substrate is a paper.

16. The tape construction of claim 15, wherein the layer contacting the paper substrate is a blend of a polyolefin and a polyolefin copolymer, the polyolefin copolymer comprising the residue of acrylic acid or maleic anhydride.

17. The tape construction of claim 1 wherein the tape construction is embossed.

18. The tape construction of claim 17 wherein the release layer is the embossed layer.

19. The tape construction of claim 18 further comprising a bead composition disposed on the release layer.

20. A release layer made by the method comprising
a. forming an alkyl dimethicone by carrying out a first hydrosilylation reaction employing an α-olefin having between 20 and 50 carbon atoms, carrying out a second hydrosilylation reaction employing a strippable α-olefin having between 6 and 10 carbon atoms, and evaporating the unreacted strippable α-olefin, wherein the alkyl dimethicone has a structure corresponding to

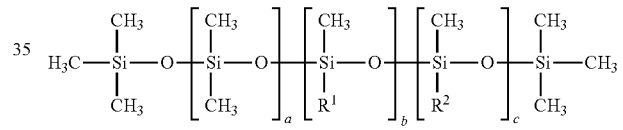

wherein the sum of (a+b+c) is between about 100 and 1000, the ratio of a to the sum of (b+c) is about 98:2 to 96:4, $R^1$ is a linear or branched alkyl group having between 20 and 50 carbons, and $R^2$ is a linear alkyl group having 6 to 10 carbons;
b. combining a polyolefin with about 0.5 wt % to 10 wt % of the alkyl dimethicone to form a blend; and
c. melt processing the blend to form a release layer, wherein the method is characterized by the absence of a post-treatment after melt processing.

21. The release layer of claim 20 wherein the melt processing comprises extrusion or coextrusion.

22. The release layer of claim 21 wherein the melt processing comprises casting, coating, or melt blowing.

23. The release layer of claim 22 wherein the melt processing further comprises embossing.

24. The release layer of claim 20 wherein the melt processing further comprises coating the release layer onto a substrate.

25. A method of making a release layer, the method comprising
a. forming an alkyl dimethicone by carrying out a first hydrosilylation reaction employing an α-olefin having between 20 and 50 carbon atoms, carrying out a second hydrosilylation reaction employing a strippable α-olefin having between 6 and 10 carbon atoms, and evaporating the unreacted strippable α-olefin, wherein the alkyl dimethicone has a structure corresponding to

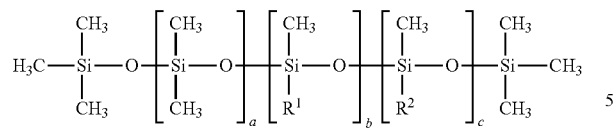

wherein the sum of (a+b+c) is between about 100 and 1000, the ratio of a to the sum of (b+c) is about 98:2 to 96:4, $R^1$ is a linear or branched alkyl group having between 20 and 50 carbons, and $R^2$ is a linear alkyl group having 6 to 10 carbons;

b. combining a polyolefin with about 0.5 wt % to 10 wt % of the alkyl dimethicone to form a blend; and c. melt processing the blend to form a release layer, wherein the method is characterized by the absence of a post-treatment after melt processing.

* * * * *

UNITED STATES PATENT AND TRADEMARK OFFICE
CERTIFICATE OF CORRECTION

| | | |
|---|---|---|
| PATENT NO. | : 9,187,678 B2 | Page 1 of 1 |
| APPLICATION NO. | : 13/953474 | |
| DATED | : November 17, 2015 | |
| INVENTOR(S) | : Larry Boardman | |

It is certified that error appears in the above-identified patent and that said Letters Patent is hereby corrected as shown below:

ON THE TITLE PAGE

Column 2
First page, (Other Publications), Line 4, delete "Technial" and insert -- Technical --

IN THE SPECIFICATION

Column 23
Line 66, delete "a of" and insert -- of a --

Column 26, Table 9
Line 25, delete "Ampecet" and insert -- Ampacet --

Line 28, delete "Ampecet" and insert -- Ampacet --

Line 32, delete "Ampecet" and insert -- Ampacet --

Line 38, delete "Ampecet" and insert -- Ampacet --

Line 42, delete "Ampecet" and insert -- Ampacet --

Column 28
Line 65, delete "25 lam" and insert -- 25 μm --

Signed and Sealed this
Eighth Day of March, 2016

Michelle K. Lee
*Director of the United States Patent and Trademark Office*